United States Patent
Levoy et al.

(10) Patent No.: US 7,723,662 B2
(45) Date of Patent: May 25, 2010

(54) MICROSCOPY ARRANGEMENTS AND APPROACHES

(75) Inventors: Marc S. Levoy, Stanford, CA (US);
Yi-Ren Ng, Mountain View, CA (US);
Mark A. Horowitz, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 12/089,371

(22) PCT Filed: Oct. 6, 2006

(86) PCT No.: PCT/US2006/039569
§ 371 (c)(1),
(2), (4) Date: Apr. 4, 2008

(87) PCT Pub. No.: WO2007/044725
PCT Pub. Date: Apr. 19, 2007

(65) Prior Publication Data
US 2008/0266655 A1  Oct. 30, 2008

Related U.S. Application Data

(60) Provisional application No. 60/724,564, filed on Oct. 7, 2005, provisional application No. 60/764,428, filed on Feb. 2, 2006.

(51) Int. Cl.
*H01L 27/00* (2006.01)
(52) U.S. Cl. .................. 250/208.1; 250/227.2; 359/368
(58) Field of Classification Search .............. 250/208.1, 250/227.2
See application file for complete search history.

(56) References Cited

U.S. PATENT DOCUMENTS

| | | | |
|---|---|---|---|
| 4,661,986 A | 4/1987 | Adelson | |
| 5,076,687 A | 12/1991 | Adelson | |
| 5,448,395 A | 9/1995 | Lopez et al. | |
| 5,616,912 A | 4/1997 | Robinson et al. | |
| 5,748,371 A | 5/1998 | Cathey, Jr. et al. | |
| 6,023,523 A | 2/2000 | Cohen et al. | |
| 6,028,606 A | 2/2000 | Kolb et al. | |
| 6,097,394 A | 8/2000 | Levoy et al. | |
| 6,842,297 B2 | 1/2005 | Dowski, Jr. et al. | |
| 6,903,347 B2 * | 6/2005 | Baer .................. | 250/492.2 |
| 2002/0159030 A1 | 10/2002 | Frey et al. | |
| 2003/0117511 A1 | 6/2003 | Belz et al. | |

(Continued)

OTHER PUBLICATIONS

Jackson et al. "Selection of a Convolution Function for Fourier Inversion Using Gridding." *IEEE Transactions on Medical Imaging*, Sep. 1991. vol. 10, No. 3, pp. 473-478.

(Continued)

*Primary Examiner*—Seung C Sohn
(74) *Attorney, Agent, or Firm*—Crawford Maunu PLLC

(57) ABSTRACT

Light-field microscopy is facilitated using an approach to image computation. In connection with an example embodiment, a subject (e.g., 105) is imaged by passing light from the subject through a microlens array (e.g., 120) to a photosensor array (e.g., 130) to simultaneously detect light from the subject that is passed through different directions to different locations. In certain embodiments, information from the detected light is used to compute refocused images, perspective images and/or volumetric datasets, from a single-shot photograph.

24 Claims, 15 Drawing Sheets

U.S. PATENT DOCUMENTS

| | | |
|---|---|---|
| 2003/0156077 A1 | 8/2003 | Balogh |
| 2005/0080602 A1 | 4/2005 | Snyder et al. |
| 2007/0252074 A1 | 11/2007 | Ng et al. |

OTHER PUBLICATIONS

Naemura et al. "3-D Computer Graphics based on Integral Photography." *Optics Express*, Feb. 12, 2001. vol. 8, No. 2, pp. 255-262.

Okano et al. Three-dimensional video system based on integral photography. *Optical Engineering*, Jun. 1999. vol. 38, No. 6, pp. 1072-1077.

Adelson et al. "Single Lens Stereo with a Plenoptic Camera." *IEEE Translation on Pattern Analysis and Machine Intelligence*, Feb. 1992. vol. 14, No. 2, pp. 99-106.

Levoy et al. "Light Field Rendering." *SIGGRAPH 96 Proceeding*, 1996. pp. 31-42.

Isaken et al. "Dynamically Reparameterized Light Fields." *SIGGRAPH 2000*, Computer Graphics Proceedings. 10 pgs.

Agarwala et al. "Interactive Digital Photomontage." *ACM SIGGRAPH 2004*, vol. 23, No. 3, pp. 292-300.

Haeberli. "A Multifocus Method for Controlling Depth of Field." *GRAPHICAObscura*, 1994, pp. 1-3.

P. Sen et al. "Dual photography." *ACM Transactions on Graphics*, Jul. 2005, vol. 24, No. 3, pp. 745-755.

Ng. "Fourier Slice Photography." *ACM Transactions on Graphics*, Jul. 2005, 10 pgs.

Ng. et al. "Light Field Photography with a Hand-Held Plenoptic Camera." *Stanford Tech Report CTSR 2005-02*, Apr. 2005, pp. 1-11.

Chen et al. "Interactive Deformation of Light Fields." *Symposium on Interactive 3D Graphics*, 2005, pp. 139-146.

Levoy. "Light Fields and Computational Imaging." IEEE Computer Society, Aug. 2006, pp. 46-55.

Garg et al. "Symmetric Photography: Exploiting Data-sparseness in Reflectance Fields." *Eurographics Symposium on Rendering*, 2006, 12 pgs.

Levoy et al. "Synthetic Aperture Confocal Imaging." *ACM Transactions on Graphics*, Aug. 2004, vol. 23, No. 3, pp. 825-834.

* cited by examiner

MICROSCOPY ARRANGEMENTS AND APPROACHES

RELATED PATENT DOCUMENTS

This patent document is the national stage filing under 35 U.S.C. §371 of International Application No. PCT/US2006/039569 filed on Oct. 6, 2006; which claims benefit under 35 U.S.C. §119(e) to U.S. Provisional Patent Application No. 60/724,564, entitled "Light-field Microscopy Arrangements and Approaches" and filed on Oct. 7, 2005; and to U.S. Provisional Patent Application No. 60/764,428, entitled "3D Light-field Microscopy Arrangements and Approaches" and filed on Feb. 2, 2006; this patent document is also related to PCT Patent Application No. PCT/US2005/035189, entitled "Imaging Arrangements and Methods Therefor," filed on Sep. 30, 2005, which is fully incorporated herein by reference.

This patent document includes Appendices A-B. both of which are fully incorporated herein by reference and form part of the application.

FIELD OF THE INVENTION

The present invention relates generally to imaging applications, and more specifically to imaging applications and arrangements involving microscopy.

BACKGROUND

Microscopy imaging applications involving light field microscopes and/or cameras, video cameras, telescopes and more have generally been limited in their ability to obtain image data from subjects. That is, most imaging devices do not record most of the information about light distribution entering the device. For example, conventional microscopes do not record most of the information about the light distribution entering from the world. In these devices, collected light is often not amenable to manipulation for a variety of approaches, such as for focusing at different depths (distances from the imaging device), correcting for lens aberrations or manipulating an angle of view.

Many imaging applications suffer from aberrations with the equipment (lenses) used to collect light. Such aberrations may include, for example, spherical aberration, chromatic aberration, distortion, curvature of the light field, oblique astigmatism and coma. Correction for aberrations has typically involved the use of corrective optics, which tend to add bulk, expense and weight to imaging devices. In some applications benefiting from small-scale optics, the physical limitations associated with the applications make it undesirable to include additional optics.

Microscopes are the primary scientific instrument in many biological laboratories. In a transmission-mode light microscope, an illumination source is focused by a condenser lens (for illumination) onto a specimen. An objective lens magnifies the specimen, creating a real image at an intermediate image plane. In more traditional microscopes, the intermediate image plane is located inside the microscope tube, and ocular (eyepiece) further magnifies a portion of this image, thereby creating a second image that is focused at infinity. Although the performance of microscopes, and their ease of use, has improved dramatically over their 400-year history, microscopes suffer from several limitations. First, diffraction limits their spatial resolution, especially at high magnification. This limit can be ameliorated by enlarging the lens opening (called the numerical aperture) while keeping the lens strongly curved, but we reach a practical limit when the lens becomes a half-sphere. Second, in a microscope, objects are seen in orthographic projection from a single direction. Moving the specimen laterally on the microscope stage does not produce parallax, making it hard to disambiguate superimposed features. Third, microscopes have a very shallow depth of field, particularly at high magnification and numerical apertures. This "optical sectioning" is useful when viewing thick specimens, but examining the entire specimen requires moving the stage up and down, which is slow and may not be possible on live or light-sensitive specimens.

Difficulties associated with the above have presented challenges to microscopy imaging applications, including those involving the acquisition and altering of digital images.

SUMMARY

The present invention is directed to overcoming the above-mentioned challenges and others related to imaging devices and their implementations. The present invention is exemplified in a number of implementations and applications, some of which are summarized below.

According to an example embodiment of the present invention, a light-field microscopy system provides information useful for imaging a specimen. The system includes an objective lens and a photosensor array, with a microlens array located at an intermediate image plane between the objective lens and the photosensor array. The photosensor array detects light rays passing from the objective lens and through the microlens array, the detected light facilitating the computation of an image of the specimen.

As described in detail with further examples below, a variety of approaches are implemented for computing images. These approaches (e.g., using the aforesaid microscopy system) are applicable to the computation of two-dimensional images, three-dimensional images, and generally to the computation of a three-dimensional volume dataset.

In connection with another example embodiment, the light-field microscopy system includes an image processor, coupled with and/or separately from the photosensor array, and adapted to use light data from the photosensor array to compute an image. In some applications, the processor computes a two-dimensional image. In other applications, the processor computes an image using a three-dimensional (3D) deconvolution approach, and in other applications, using a tomography approach.

Other example embodiments are directed to the implementation of processing and/or light filtering to address aberrations or facilitate the detection of certain specimen characteristics.

In connection with another example embodiment, the light-field microscopy system and image processor are adapted to use light data from the photosensor array to compute views of the specimen that are focused on different horizontal planes within the specimen. Such images are obtained, for example, without necessarily moving the specimen (e.g., via movement of a microscope stage) or optics. Furthermore, a multitude of such images can be obtained from light detected at an instant (e.g., with a single photograph).

In connection with another example embodiment, light data from the photosensor array is used to compute views of the specimen that exhibit different perspectives of the specimen. Such perspectives represent, for example, different points of view or different amounts of parallax (ranging from wide-angle to telephoto).

According to another example embodiment, spatially graduated filters are placed in a microscope optical train to facilitate the detection and recording of a light field in which each ray represents not only a unique position and direction of light, but also a unique exposure range, spectral range, polarization angle, or phase delay.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1A:
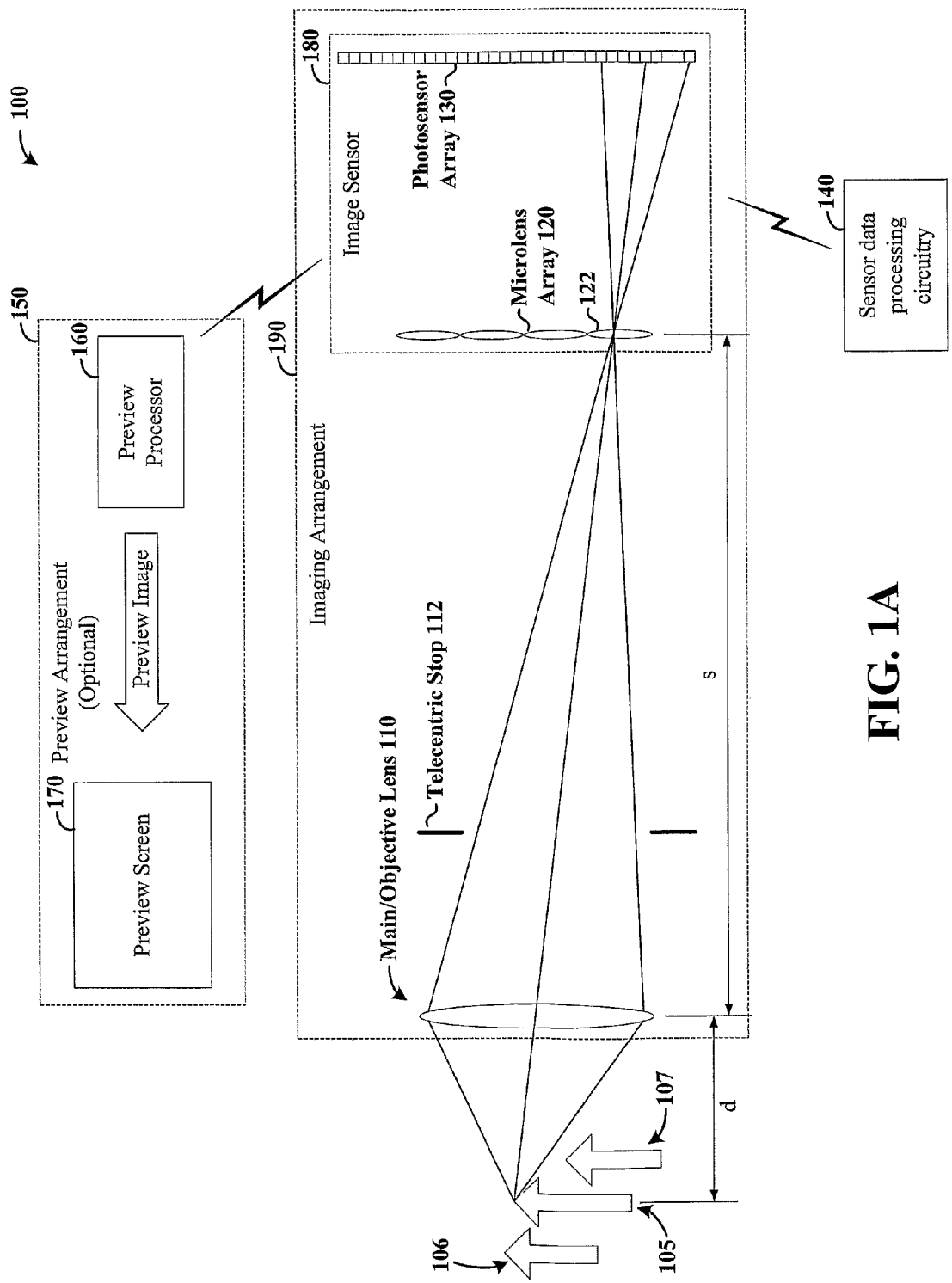
FIG. 1A is a light ray capturing and processing light-field microscopy arrangement, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different types of devices, and the invention has been found to be particularly suited for light field microscopy imaging devices and applications. While the present invention is not necessarily limited to such applications, various aspects of the invention may be appreciated through a discussion of various examples using this context.

According to an example embodiment of the present invention, a light field microscopy approach and arrangement involves the use of a microscope objective, a photosensor array and an array of microlenses between the objective and the photosensor array at an intermediate image plane of the microscope objective. The microlenses direct light to the photosensor array, which detects the light. The detected light is processed to determine characteristics of the light detected at each photosensor in the array, and the detected light is used to compute an image.

In some applications, light detected with a single photograph is used to capture a light field from a specimen. In connection with these applications, a light field may be defined as radiance (a measure of light intensity) along lines through three-dimensional space in a region of space that is free of occluders. Since the position and directions of lines in three-dimensional space require four parameters to uniquely specify them, a light field is a four-dimensional dataset. In connection with one embodiment, light fields are captured using an arrangement of a microlens array and a photosensor; images obtained can equivalently be interpreted as a four-dimensional dataset. Data collected via the photograph can then be processed in one or more of a variety of manners, at a desirable time if appropriate, to generate different images. For instance, in some applications, the data is processed to generate images at different depths into a specimen, such as by using synthetic focusing to produce a focal stack that is a sequence of images, each focused at a different plane. In other applications, the data is processed via light field rendering to generate perspective images with the ability to shift the virtual viewpoint.

A variety of microscope arrangements and applications are implemented in connection with example embodiments of the present invention. Some applications are directed to the use of a transmission-mode light microscope, wherein an illumination source is focused by a condenser lens onto a specimen. An objective lens magnifies the specimen, creating a real image at an intermediate image plane, where a microlens array is placed. A camera sensor is placed behind this, positioned so that each microlens records an in-focus image of the objective. In light field parlance, if the objective aperture and specimen constitute the uv and st planes, then the camera sensor and microlens array constitute a reimaging of these two planes. For general information regarding light fields and for specific information regarding approaches to which these or other example embodiments herein may be applicable, reference may be made to Levoy, M., Hanrahan, P. 1996, "Light Field Rendering," *Proc. SIGGRAPH* 1996, which is fully incorporated herein by reference, and which is further attached hereto as Appendix A.

According to another example embodiment of the present invention, a four-dimensional (4D) light field is detected using an approach involving the determination of the amount and direction of light arriving at an array of microlenses at the intermediate focal plane of a light-field microscope (e.g., as described above). The amount of light arriving at each point in the focal plane is detected via photosensors, together with information characterizing the direction from which the light arrived at particular locations in the plane. With this approach, the directional lighting distribution arriving at different locations at the intermediate focal plane, as detected by the photosensor, is determined and used to form an image of a microscopic specimen. In various discussions herein, the assembly or assemblies implemented for sensing and/or measuring of a light field are referred to as a "light ray sensor," or a "ray sensor."

In one application, a microscopy approach similar to the above is implemented using an imaging system having optics and sensors that sample the space of light rays that are incident on an imaging plane, with computational functionality that renders images from the set of measured rays in different ways. The optics, sensors and computational functionality of the imaging system are implemented using a variety of approaches, in combination or distinctly, depending upon the application. For example, computational functionality tailored to the orthographic nature of light views in microscopy applications, as well as to the wave-nature of light, facilitates the computation of an image, or an image stack, from a specimen. In any instance, an output from the photosensor array is used with computational functions (e.g., at a processor internal and/or external to the imaging system) to render images, such as by computing photographs that are focused at different depths or with different depths of field, and/or computationally correcting lens aberrations to produce higher quality images.

In some embodiments, a light field is used to compute 3D volume datasets, a three-dimensional array of scalar values (sometimes called voxels), in which each voxel represents the physical characteristics of a unique position in the three-dimensional specimen. As described in detail with further examples below, a variety of approaches are used to compute this volume dataset. For instance, in some embodiments, detected light is synthetically focused and the volume is computed therefrom using 3D deconvolution. Generally, blurred contributions by features off the image plane of a specimen (i.e., slices of a focal stack) are removed, using knowledge of the nature of the blurring and an inverse filtering approach. Such a 3D deconvolution approach may be carried out in a manner similar to that described in Agard, D. Al., "Optical Sectioning Microscopy: Cellular architecture in Three Dimensions," *Ann. Rev. Biophys. Bioeng.* 13, 191-219, 1984, which is fully incorporated herein by reference.

In other embodiments, an image is computed from detected light using a tomography approach with a 4D light field as detected from light passed through microlenses at the intermediate focal plane of a light-field microscope. For instance, such an approach may involve the tomographic computation of an image or image stack in a manner similar to that described in Kak, A. C., Slanley, M., "Principles of Computerized Tomographic Imaging," *IEEE Press,* 1988, and also Herman, G. T., "Image Reconstruction from Projections," *Academic Press,* 1980, which are fully incorporated herein by reference.

In some applications, a camera having lenses (optics) that focus an image upon a photosensor array (sensors) is used to sample the space of light rays passed via a microscope. In this context (and as may be applicable to other discussion herein), a camera may include a self-contained type of unit, or be implemented with a microscope arrangement. Such an approach may be implemented using one or more camera arrangements and approaches similar to that described, for example, in PCT document WO 2006/039486 A2, entitled "Imaging Arrangements and Methods Therefor," Ng et al. (fully incorporated herein by reference).

In another example embodiment, optics and sensor components of an imaging system direct rays of light onto sensor elements such that each sensor element senses a set of rays including rays emanating from specific directions. In many applications, this set of rays is a bundle of rays that is localized in both space and direction. For many applications, this bundle of rays will converge to a single geometric ray of light as the optics and sensor resolutions increase. In this regard, various portions of the description herein refer to the values sensed by the sensor elements as "rays of light" or "light rays" or simply "rays," even though in general they may not be limited to geometric rays.

According to another example embodiment of the present invention, a light field microscopy arrangement includes a set of optics, a photosensor array and corresponding processing circuitry respectively adapted to direct light, to detect the directed light and to use directional information about the detected light to generate a refocused image of a subject in a collected light field. The set of optics generally focuses light to a microlens array that diverges the focused light to the photosensor array. In this context, focusing the image involves one or both of focusing at a particular focal depth (e.g., different than the focal depth associated with the microlens plane) and correcting for lens aberrations. The photosensor array is located at a depth, relative to the microlens array, that facilitates an f-number (focal ratio, or diameter of an aperture in terms of the effective focal length of the lens) that corresponds to the f-number of the microscope optics arrangement directing light to the microlens array.

In some applications, a light-field microscopy approach involves computing perspective views of a specimen, digitally rotating an image of a specimen and/or digitally focusing up and down through a specimen. In certain applications, this approach is applied to imaging moving (e.g., live) specimens, which move quickly out of focus, or specimens that are compromised (or killed) by the light needed to photograph them. In other applications, a focal stack is produced and used to perform deconvolution microscopy, producing a stack of cross sections. In still other applications, a cross-section stack is computed directly from a captured four-dimensional (4D) light field using limited-angle tomography, with resulting three-dimensional (3D) datasets visualized using volume rendering.

Turning now to the figures, FIG. 1A shows a light-field microscopy arrangement 100 for detecting and processing light, according to another example embodiment of the present invention. The arrangement shown in FIG. 1A may, for example, be implemented using one or more of the approaches shown and described below as applied to microscopy applications, and as further implemented with additional discussion of FIG. 1A below. This discussion includes that made in connection with other example embodiments relating to other photographic applications (providing, for certain applications, a more detailed description of the arrangement 100). In addition, the arrangement shown in FIG. 1A is implemented using one or more approaches as those appearing with Levoy, et al., "Light Field Microscopy," *ACM Transactions on Graphics* 25(3), *Proceedings of SIGGRAPH* 2006, which is fully incorporated herein by reference. For instance, some applications are directed to the implementation of the arrangement in FIG. 1A using an approach similar to that shown in FIGS. 2(*b*) and 2(*c*) in the "Light Field Microscopy" reference, as well as the approaches described therein for the selection of microlenses, objectives, photosensors, other optics and their arrangement, as well as processing approaches (e.g., involving tomography or 3D deconvolution approach).

The microscopy arrangement 100 is arranged to image a microscopic specimen, represented by subject 105 and/or a specimen having physical portions at 105, 106 and 107.

Generally, the specimen is illuminated in a manner similar to that carried out in microscopy applications, and using a spatially and angularly uniform illumination, provided via a light source and/or as facilitated using diffusers, can be used to achieve desirable illumination. Such a specimen is imaged through a microscope objective, represented in simplified form by the main lens 110, with light passing through a telecentric stop 112 (e.g., a ring, with a cross-section of upper and lower portions shown) and focused onto a focal plane, sometimes called the intermediate image plane, at which a microlens array 120 lies. While four microlenses in the microlens array 120 are depicted in FIG. 1A for brevity, several such lenses are contemplated (e.g., a 4×4 array here), with a variety of applications directed to the implementation of micro lens arrays with varied numbers of microlenses.

A photosensor array 130 is located beyond the microlens array, opposite from the object-side (specimen side) of the objective 110, and detects light passed by the microlens array 120. Generally, the photosensor array 130 and the microlens array 120 are arranged in a variety of manners, and in some applications, form part of an image sensor 180 as a common unit. For instance, one application is directed to the use of a microscope objective (110) that is an 8× objective having a numerical aperture (NA) of 0.15, where the f-number of the object side ($F_{\#O}$, where subject 105 lies) is f/3.3. Correspondingly, the f-number at the image side ($F_{\#I}$, where the microlens array 120 lies) is represented by $8 \times F_{\#O}$=f/26.3. Various such applications with different lens size and arrangements are implemented in connection with different microscopy applications.

Various embodiments of the present invention are directed to the implementation of an optics arrangement, such as that shown in FIG. 1A, together with the computational approaches as described herein and or in the above-referenced PCT patent document entitled "Imaging Arrangements and Methods Therefor." Using such an arrangement, the microlens array 120 is implemented with a relatively long focal length to facilitate the filling of the photosensor array 130 with images of the objective's (main lens') aperture, and in some implementations, without either wasting sensor space or creating crosstalk between the images. The f-number of the microlenses in the microlens array 120 is selected to match the image-side f-number of the microscope objective. In some applications, an image formed at a focal plane of an objective lens (e.g., lens 110 in FIG. 1A) is passed with a relay lens for recording. For instance, the sensor 130 can be removed, a 1:1 relay lens is placed to the right of the plane of the sensor as shown and is focused onto the plane of the sensor, with the a photosensor is placed further to the right of the relay lens. In one implementation, this relay lens and photosensor together constitute an ordinary camera with a 1:1 macro lens that is focused onto the plane where the sensor 130 is shown.

In connection with certain example embodiments, example microlens f-numbers that can be implemented with FIG. 1A with an objective (110) are as follows. In one application, a 40×0.75 NA (f/0.44) microscope objective is used, with the microlenses arranged with an f-number of f/17.6, and with the distance "d" at 4 mm and the distance "s" at 160 mm, with the distance between the microlens array and the photosensor array 130 being about 2.5 mm. In connection with this example embodiment, an array of f/20 microlenses facilitates relatively large and useful images.

Various combinations of sensor pixel counts (e.g., 3,378 squared), microlens pixel counts (e.g., 4×4), and microlens array size (e.g., 844×844 microlenses), are implemented in connection with various example embodiments. Other relationships respectively involve pixel counts of 8×8, 12×12 and 16×16, with respective array sizes of 422×422, 316×316 and 211×211. In some applications, an array of 20×20 pixels are recorded per microlens (e.g., as discussed above, using a 20×20 array of photosensors upon which light from a single microlens is diverged, facilitating the determination of an angle of incidence of the detected light upon the single microlens). With this approach, microlenses measuring about 125× 125 microns are selectively implemented. In this regard, an array of 288×192 microlenses, each being about 125×125 microns in size is used to yield a size of about 36 mm×24 mm for certain applications.

As described above, the arrangement of FIG. 1A (and other described microscopy systems) is implemented using a variety of approaches to detecting light and processing information obtained via the detected light to compute an image or images. For instance, a variety of approaches involve the use of a particular lens-type as well as the positioning thereof to facilitate the detection of an in-focus image of the objective via each microlens. In the following discussion, and particularly with FIGS. 1B-1I, a variety of approaches to the implementation of such systems are shown by way of thin-lens ray diagrams, in accordance with various example embodiments of the present invention. This discussion relates to the attached Appendix B, from which various aspects of the discussion the FIGS. 1B-1I draw.

Generally, each figure shows a specimen at "A," an objective at "B," a telecentric stop at "C," a microlens array at "D" and a photosensor array at "E." As may be implemented with FIG. 1A, each of these locations A-E may correspond, for example, respectively to a specimen at 105, objective lens 110, telecentric stop 112, microlens array 120 and photosensor array 130. Any gap between the first and second principle planes of each lens or lens subsystem (as may be applicable) is omitted for illustration.

Figure 1B:
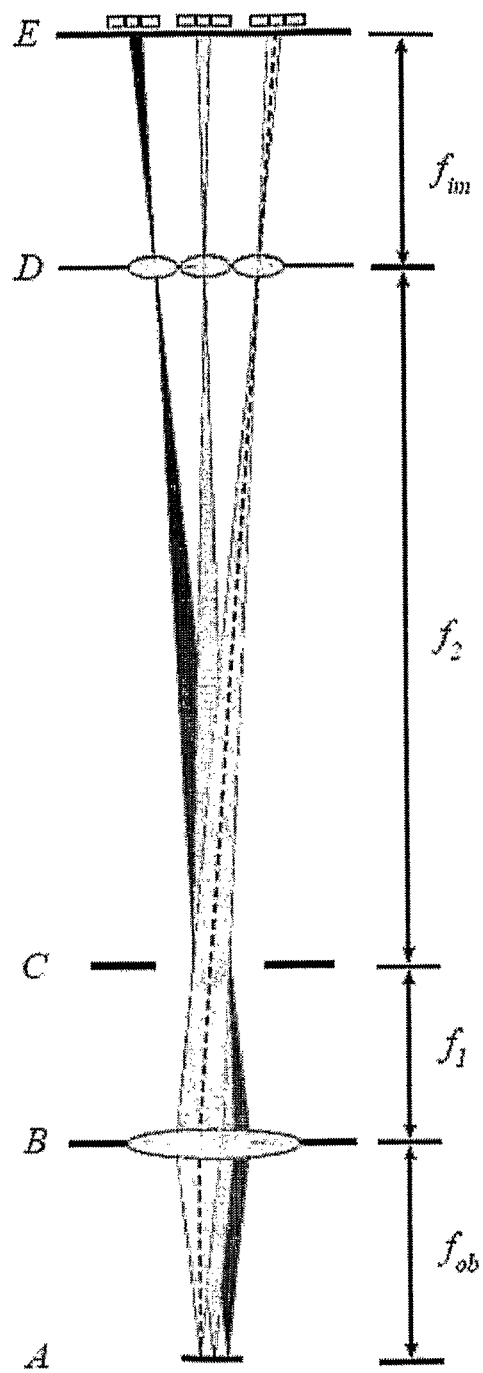
FIG. 1B shows a light field microscopy arrangement, according to another example embodiment of the present invention.
Figure 1C:
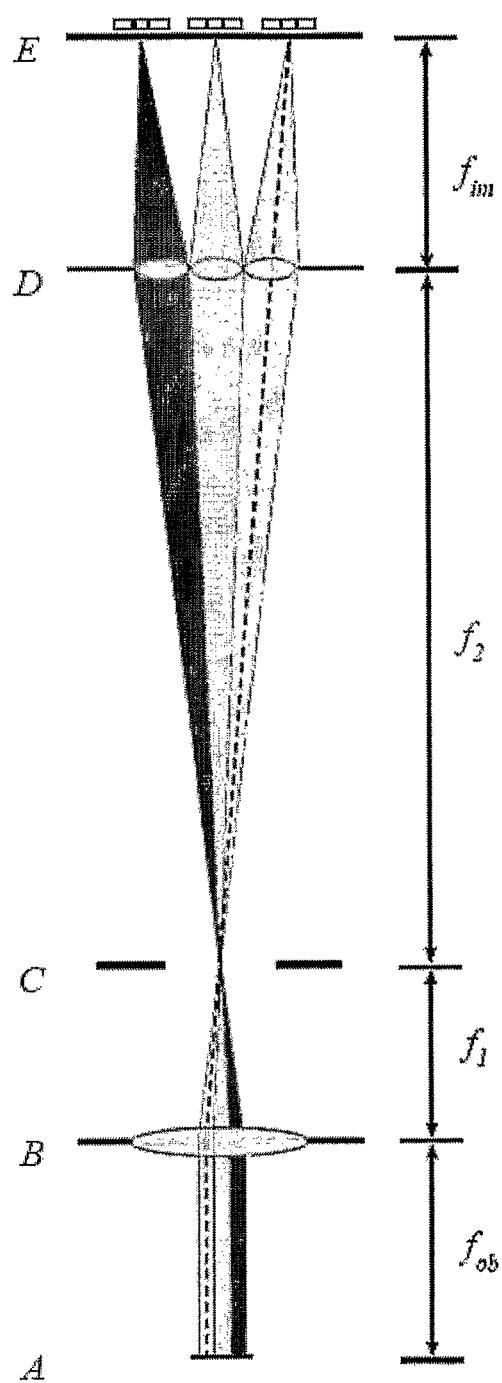
FIG. 1C shows a light field microscopy arrangement, according to another example embodiment of the present invention.
Figure 1D:
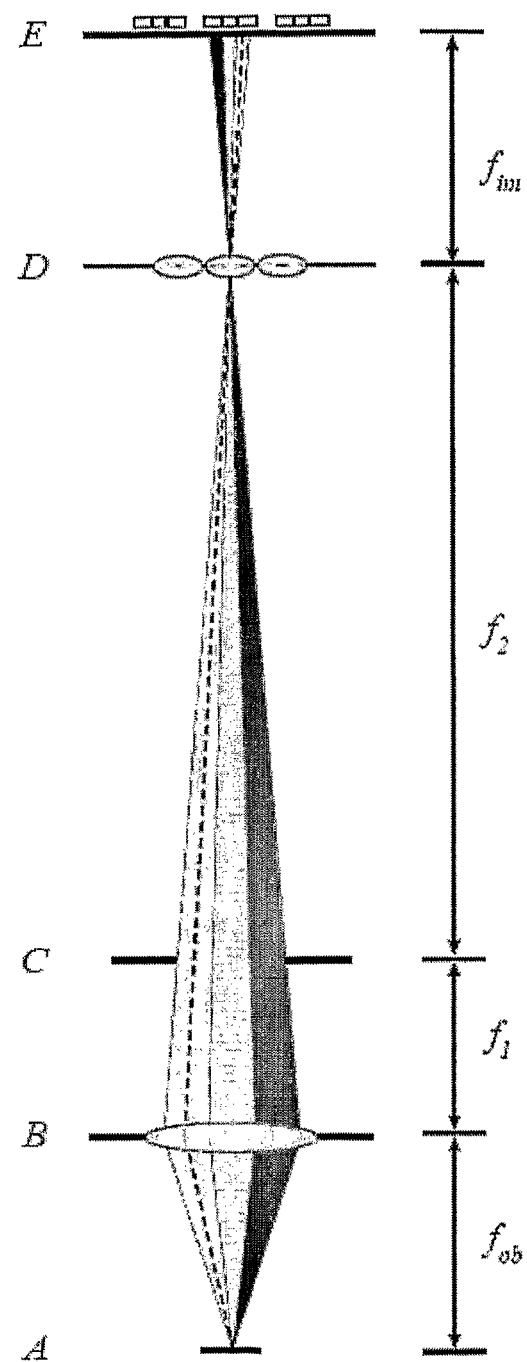
FIG. 1D shows a light field microscopy arrangement, according to another example embodiment of the present invention.
Figure 1E:
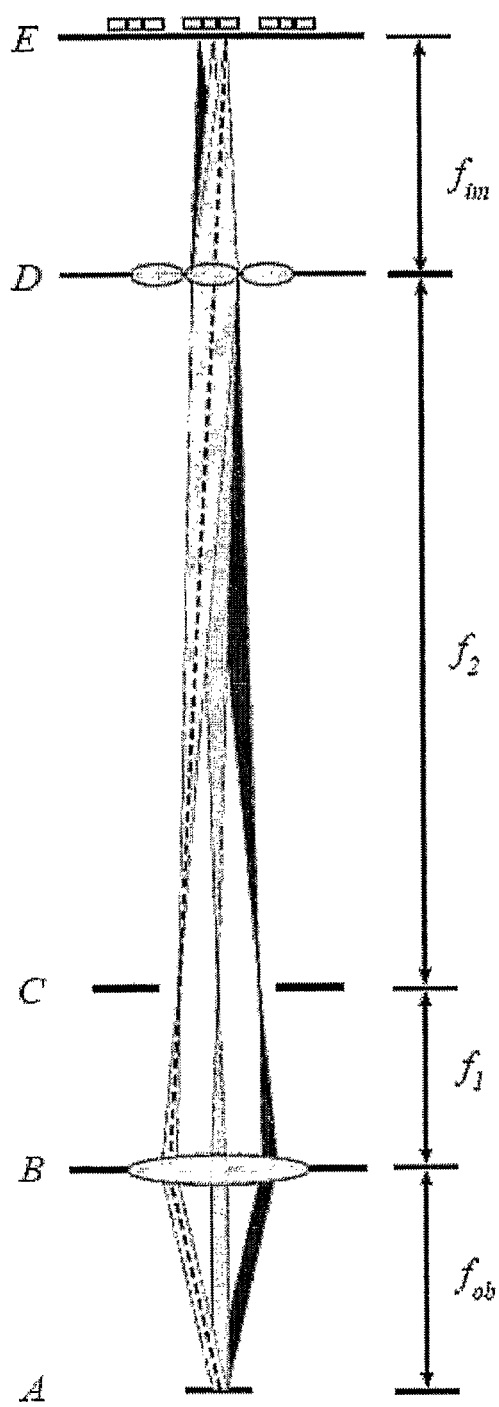
FIG. 1E shows a light field microscopy arrangement, according to another example embodiment of the present invention.
Figure 1F:
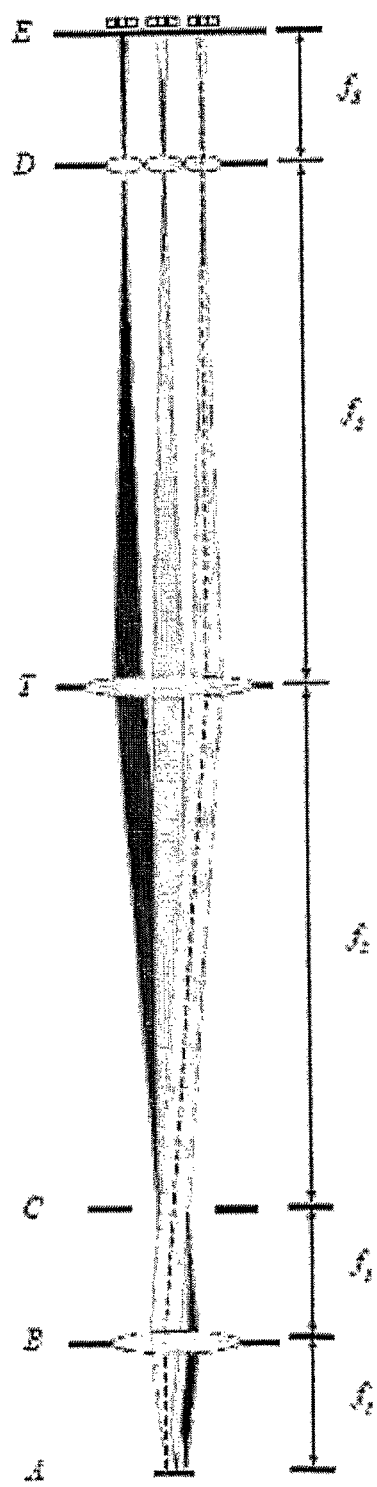
FIG. 1F shows a light field microscopy arrangement, according to another example embodiment of the present invention.
Figure 1G:
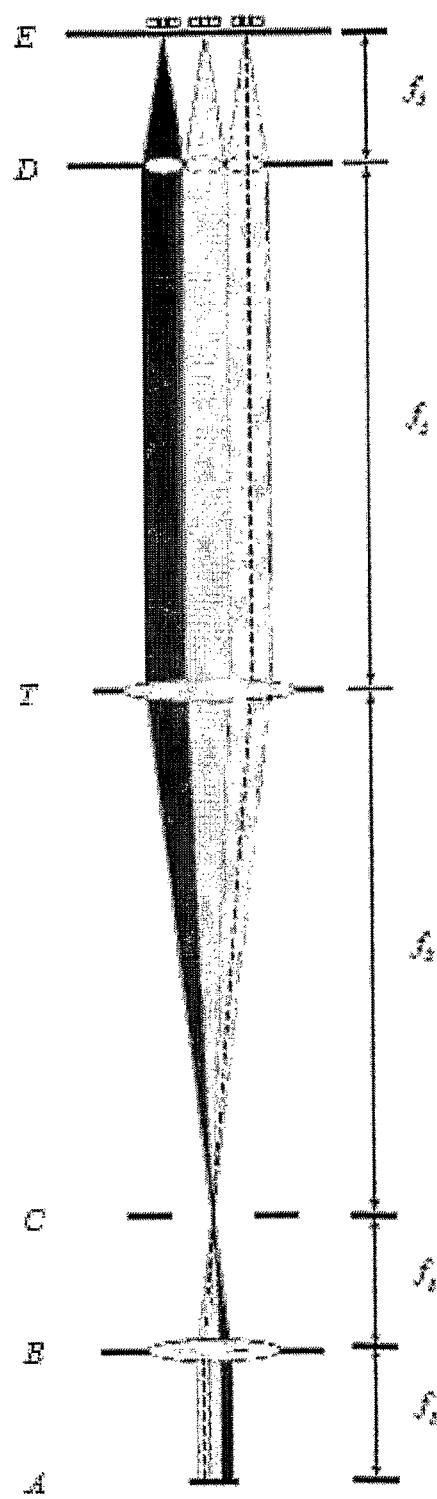
FIG. 1G shows a light field microscopy arrangement, according to another example embodiment of the present invention.

FIGS. 1B-1I, FIG. 1B, 1D, 1F and 1H show bundles of rays comparable to drawings of the "field conjugates" in a standard textbook on microscopy (see, e.g., Inoue, S. Spring, K. R., *Video Microscopy*, p. 24-25). FIGS. 1C, 1E, 1G and 1I show bundles of light that are comparable to, for example, drawings of the "aperture conjugates." In addition, the dashed lines in the following figure pairs represent the same ray within each figure pare: FIGS. 1B and 1C; FIGS. 1D and 1E; FIGS. 1F and 1G; and FIGS. 1H and 1I.

Referring to FIGS. 1B-1E, and as applicable with non-infinity-corrected optics, the microlens array placed at D forms multiple subimages on the sensor plane E. Note that the sensor at sensor plane E is shown in relatively simple form for illustrative purposes, but may include a multitude of individual sensors or groups of sensors, as described herein. In this regard, three such subimages are shown, represented diagrammatically by three non-abutting rectangles. Each subimage includes three pixels, denoted by divisions within the rectangles. If the microscope is focused normally, the intermediate image plane lies at f1+f2 behind the second principal plane of the objective, where f2 is the tube length (e.g., 160 mm) and f1 is the focal length of the objective. The telecentric stop is placed at f1 behind this second plane, thereby making the cones connecting A and B in FIG. 1B (or equivalently the shafts in FIG. 1C) parallel, which in turn makes the microscope orthographic. The distance fob from the specimen to the first principal plane of the objective is represented by:

$$1/\left(\frac{1}{f_1+f_2}-\frac{1}{f_1}\right).$$

In some applications, the microlenses are positioned so that they form on the sensor plane a focused image of the telecentric stop as shown in FIG. 1C and FIG. 1E, or of any conjugate of it, such as the condenser diaphragm if the microscope is adjusted for Kohler illumination, then the distance fim from the microlenses to the sensor is represented by:

$$1/\left(\frac{1}{f_2}-\frac{1}{f_3}\right),$$

where f3 is the focal length of a microlens. In this configuration, the central pixel in each subimage will be axial views of the specimen as shown in FIG. 1B and FIG. 1C, and the peripheral pixels in each subimage will be oblique views as shown in FIG. 1D and FIG. 1E.

Referring to FIGS. 1F-1I, and as applicable with infinity-corrected optics, a specimen at A is imaged by an objective at B through a telecentric stop at C and a tube lens at T onto an intermediate image plane at D. A microlens array placed at D forms multiple subimages on the sensor plane at E. Three such subimages are shown, as with FIGS. 1B-E.

Figure 1H:
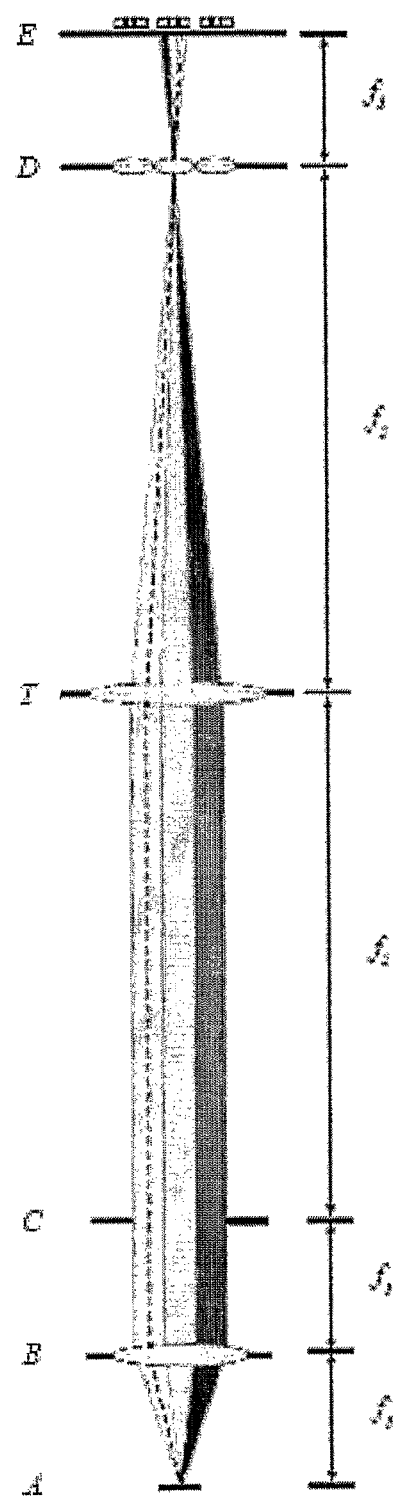
FIG. 1H shows a light field microscopy arrangement, according to another example embodiment of the present invention.

If the microscope is focused normally, the distance from the specimen to the first principal plane of the objective, and from its second principal plane to the telecentric stop, are both equal to the focal length f1 of the objective. In addition, the distance from the second principal plane of the tube lens to the intermediate image plane is f2, the focal length of the tube lens (also called the tube length in an infinity-corrected microscope). These two approaches cause the rays leaving each point on the specimen to form parallel bundles between B and T as shown in FIG. 1F and FIG. 1H. In some applications, this is referred to as the so-called "infinity section" of the microscope; its length is normally f1+f2, although this length can be modified if care is taken not to cause vignetting at the tube lens. The effect of changing this length is discussed further below, with certain embodiments.

Figure 1I:
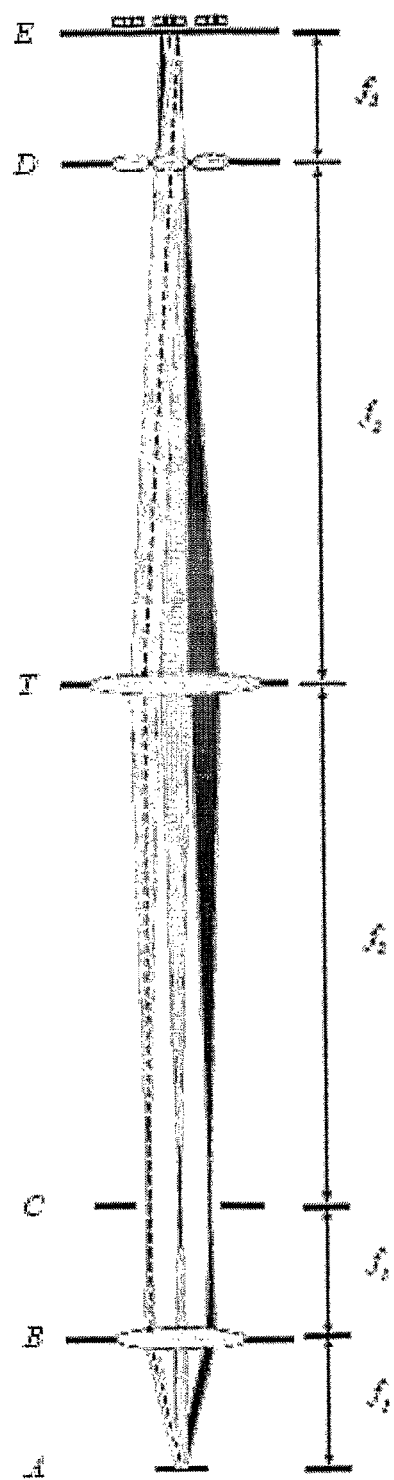
FIG. 1I shows a light field microscopy arrangement, according to another example embodiment of the present invention.

If the microlenses are positioned so that they form on the sensor plane a focused image of the telecentric stop as shown in FIG. 1G and FIG. 1I, or of any conjugate of it as before, then the distance from the microlenses to the sensor is f3, the focal length of a microlens. This distance is slightly shorter than $f_{im}$ in the non-infinity case, and the bundles of rays impinging on the sensor plane from adjacent points on the specimen are parallel and vertical in the infinity case (e.g., as with FIGS. 1F and 1G), but angled in the non-infinity case as described above. These two factors make the subimages slightly smaller in the infinity case, and the gaps between them smaller, than in the non-infinity case.

In practice these differences are very small (e.g., much smaller than they appear in the figures as shown for illustration). In addition, the design approach described herein, involving matching the f-number of the microlenses to the image-side f-number of the microscope objective, is applicable with various embodiments. On the other hand, since the chief rays of these subimages are vertical in the infinity case, they may suffer less from aberrations. In some applications of the infinity case, the microlens array is permanently bonded to a sensor, as the alignment between microlenses and pixels is consistent.

In some embodiments, such as those described with and shown in FIGS. 1F-1I, infinity-corrected microscopes include a focusing nosepiece wherein the objective moves up and down, rather than (or in addition to) the stage moving up and down, with the tube lens generally fixed. Microscopes applicable to such approaches include, for example, Nikon's physiology microscopes (e.g., the FN1) and inverted microscopes (e.g., the TE2000). On these microscopes, refocusing the microscope facilitates the changing of the length of the infinity section (as described earlier), although in this case only slightly.

The effect of changing the length of this infinity section is to move outward or inward the lateral positions of the beams from the peripheral pixels (red and yellow beams in FIGS. 1F and 1G) where they pass through the tube lens. Following these changes upward through the optical train, these peripheral beams will thereby be rotated around fixed points on the intermediate image plane. That is, in the light field microscope, these beams continue upward to the sensor plane, where the location and width of the subimages change.

Generally, the aforesaid changes are relatively small, left uncorrected in some applications, and corrected in other applications. For example, for a 40× objective with f1=4 mm, f2=160 mm, f3=2.5 mm, and a field half-width W of 10 mm at the intermediate image plane, if the microscope is refocused by 1 micron in Z, thereby moving the exit pupil at B by 1 micron in Z, the centroid of the yellow beam at T is laterally shifted by 1 micron/(f2/W)=1/16 micron. This causes a lateral shift (in the other direction) of the centroid of the yellow beam when it reaches E of 1/16 micron/(f2/f3)=1 nanometer. Correspondingly moving the objective 100 microns in Z will shift the subimages laterally by about 100 nanometers, which in some applications, is two orders of magnitude smaller than the size of a typical sensor pixel.

Referring again to FIGS. 1B-1I, in FIGS. 1B, 1D, 1F and 1H, the width of each bundle is limited by the spatial extent of a pixel on the sensor, while in FIGS. 1C, 1E, 1G and 1I, their width is limited by the diameter of a microlens. Similarly, in FIGS. 1B, 1C, 1F and 1G, the width of the entire collection of ray bundles is limited by the width of the microlens array (or sensor if that is smaller), which is three microlenses in these illustrative examples, while in FIGS. 1D, 1E, 1H and 1I the corresponding limit is the diameter of the telecentric stop. With these approaches, the spatial extent of a microscope image is determined by constraints at one or more field conjugates, while the angular extent is determined by constraints at one or more aperture conjugates.

In various embodiments, the optical arrangements and approaches in FIGS. 1B-1I are implemented with a light field microscope as shown, for example, in FIG. 1A as described above, with the following approaches. The spatial resolution of the light field, hence the number of pixels in images computed from it, is set by the number of microlenses. The angular resolution of the light field (i.e., the number of unique oblique views that can be computed from it) is determined by the number of resolvable spots in each microlens subimage. This latter number also gives the number of slices with non-overlapping depths of field in focal stacks computed from the light field (e.g., as described herein). In addition, all rays that leave the specimen and not vignetted by the objective or tube lens are indeed captured by the microlens array and sensor. In other words, aside from a negligible amount of scattering from light that strikes the seams between adjacent microlenses, relatively little or no light is lost in such a light field microscope approach, as compared to a standard microscope.

In some embodiments, aliasing is mitigated. For example, the above approach to detecting all or nearly all light, together with filtering, can be implemented to mitigate aliasing. In one implementation, where insufficient pre-filtering is applied before partitioning rays among pixels on the sensor, an anti-aliasing filter is placed in front of the sensor. If the imaging arrangement (e.g., a camera employed with a microscope) has a relay lens, a less-than-perfect focusing approach is used with the relay lens (e.g., approximate rather than ideal, so that the lens does not focus precisely upon the sensor). Where insufficient pre-filtering is applied before partitioning rays among microlenses, a diffuser is placed in front of the microlens array.

In other example embodiments, super-resolution approaches are implemented to shift the microlens array by fractions of a microlens width and capture multiple light fields. This approach may be implemented to recover some of the spatial resolution lost by introducing the microlens array in the first place. In various applications, these techniques are implemented with microscope objectives having relatively low magnification and high numerical aperture.

Figure 1J:
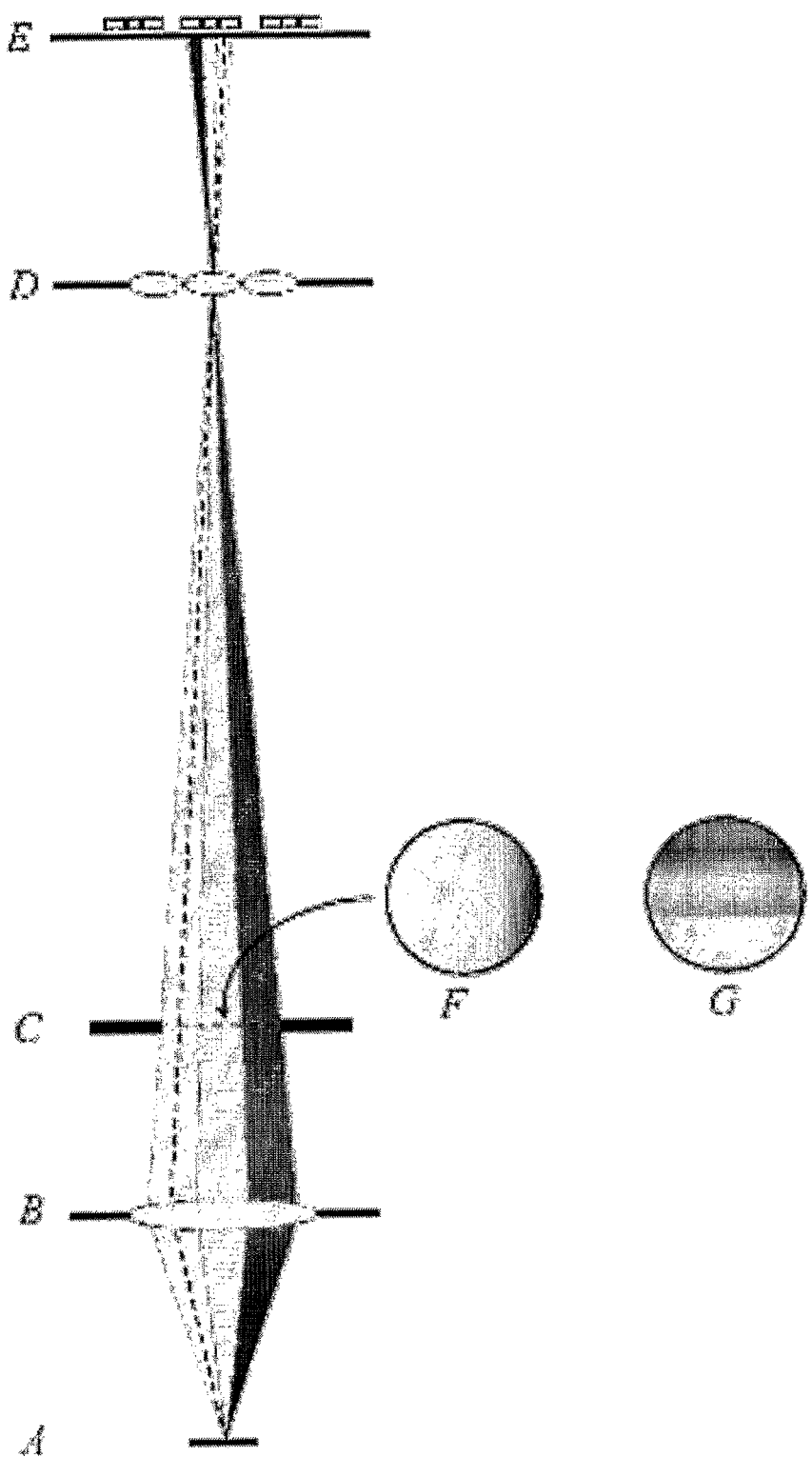
FIG. 1J shows a light field microscopy arrangement implementing a spatially-graduated filter approach, according to another example embodiment of the present invention.

As described above, filtering is implemented in connection with various example embodiments. In this regard, FIG. 1J shows a light field microscopy arrangement implementing a spatially-graduated filter approach, according to other example embodiments of the present invention. In FIG. 1J, an arrangement similar to those shown in FIGS. 1B-1E is shown, with two example spatially-graduated filters F and G shown for selective implementation at the telecentric stop at C. Other approaches are directed to the implementation of filters at the objective aperture plane (or condenser plane) to modulate the exposure, spectral selectivity, polarization or phase delay of each microlens pixel.

These arrangements are applicable to microscopes having infinity-corrected optics as well as those having non-infinity-corrected optics. In addition, these approaches are selectively implemented with one or more of a multi-variable mosaic (e.g., as an alternative to varying only one of the aforementioned parameters) or specialized devices such as an imaging spectrophotometer that is capable of imaging with a single snapshot.

For each of filters F and G, an optical parameter changes across the diameter of the filter, such that the images produced at E (through the microlenses at D from the specimen at A) contain a variation in that same parameter. For example, in one embodiment, the filter varies in transparency from left to right (as shown with filter F), and for each point on the specimen, its image at E will vary in darkness from left to right. Specifically, if the filter is relatively transparent on the left and relatively opaque on the right, then the images at E of each specimen point will vary from relatively bright on the right to relatively dark on the left. While some of these pixels may be saturated or too dark to be useful, other pixels will typically be useful. This approach permits the recording of specimens, some of whose points are very bright and others of which are very dark (e.g., specimens whose dynamic range (ratio of brightest to darkest points) varies strongly.

In connection with another embodiment, the filter G is implemented with variation in spectral selectivity from top to bottom, and for each point on the specimen, its image at E will vary in color from top to bottom. Specifically, if the filter passes mainly violets at the top and mainly reds at the bottom, then the violet wavelengths of each specimen point will be recorded at the top of each image at E, and the red wavelengths will be recorded at the bottom. This approach permits spectrographic analysis to be performed at every point on the specimen simultaneously (e.g., by capturing a single photograph).

In other embodiments, the filters shown and/or other filters are implemented to polarize light, where for certain approaches, the polarization varies from across the filter, such as from left to right or from top to bottom, or as a function of angle around the perimeter of the filter. This approach permits recording of the polarization properties of each point on the specimen in a single photograph.

In another embodiment, two or more filters are stacked together and inserted at C in FIG. 1J, with two or more optical parameters varied at once. With this filter stack approach, each pixel in images at E depicts a single point on the specimen as observed using a unique combination of these two or more optical filter parameters. For example, combinations may include a unique combination of transparency and spectral selectivity, or spectral selectivity and polarization direction. In some applications involving such stacked filters, one is varied horizontally and the other is varied vertically.

Figure 1K:
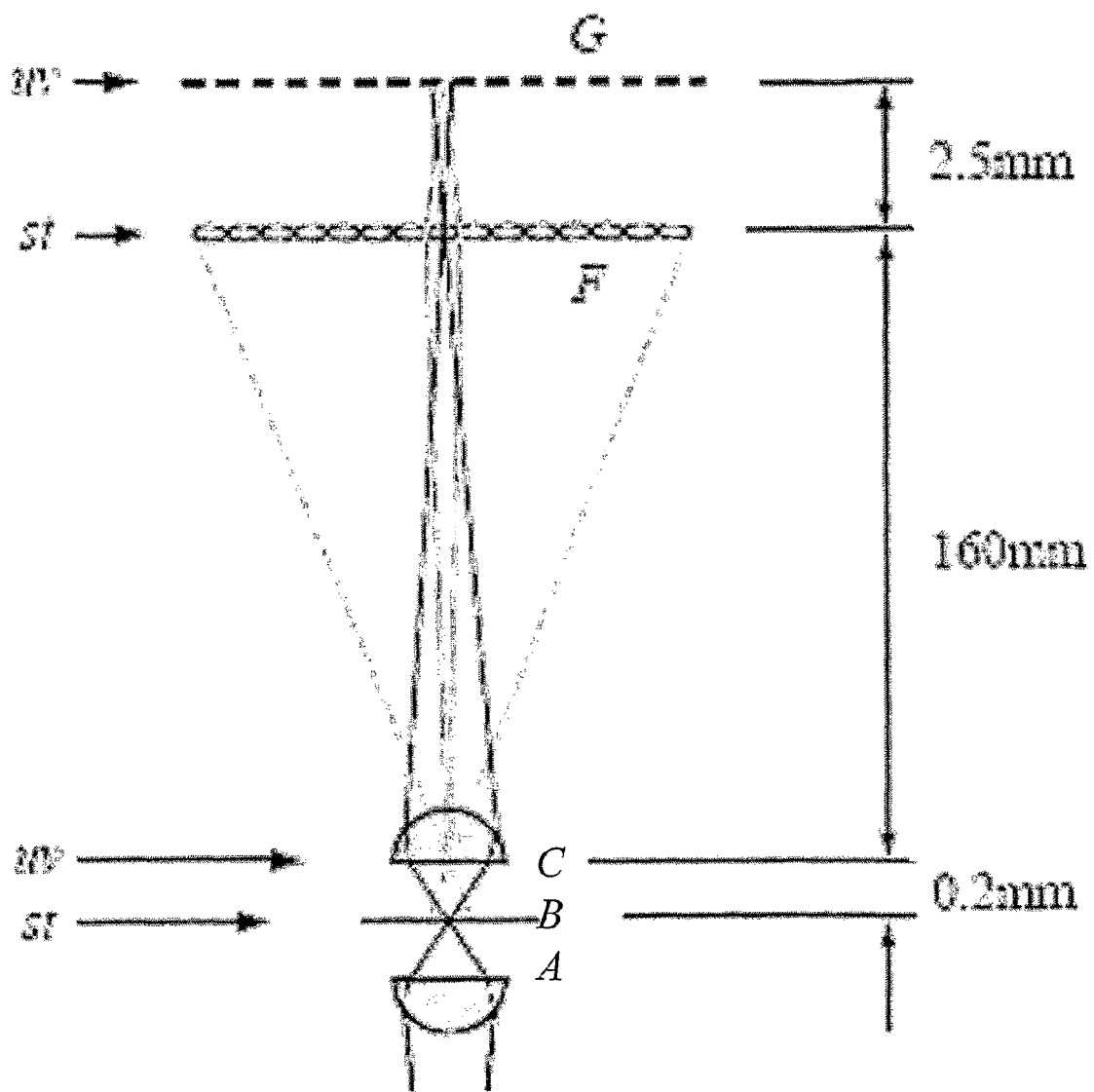
FIG. 1K shows an arrangement and approach to incorporating telecentricity into light data, according to another example embodiment of the present invention.

FIG. 1K and the following show and describe one approach to incorporating telecentricity into light data, according to another example embodiment of the present invention. The st plane is set to the field of view, and the uv plane is set to the base of the cone in FIG. 1K (e.g., represented by dashed lines), but with W (the homogeneous coordinate) equal to zero. This places the uv plane at infinity, which causes the input data to be treated as orthographic. Because translating the stage in x and y for microscopy applications provides no parallax, and because features do not shift position when they come into focus, microscopes therefore lack parallax-based depth cues. In this regard, perspective views are facilitated, with the ability to shift the virtual viewpoint provided with such views. In addition, any defocus blur (double cone at ABC), which becomes the point spread function (PSF) used in deconvolution, is shift-invariant with respect to x and y, facilitating the functioning of 3D deconvolution microscopy as described herein.

Figure 2:
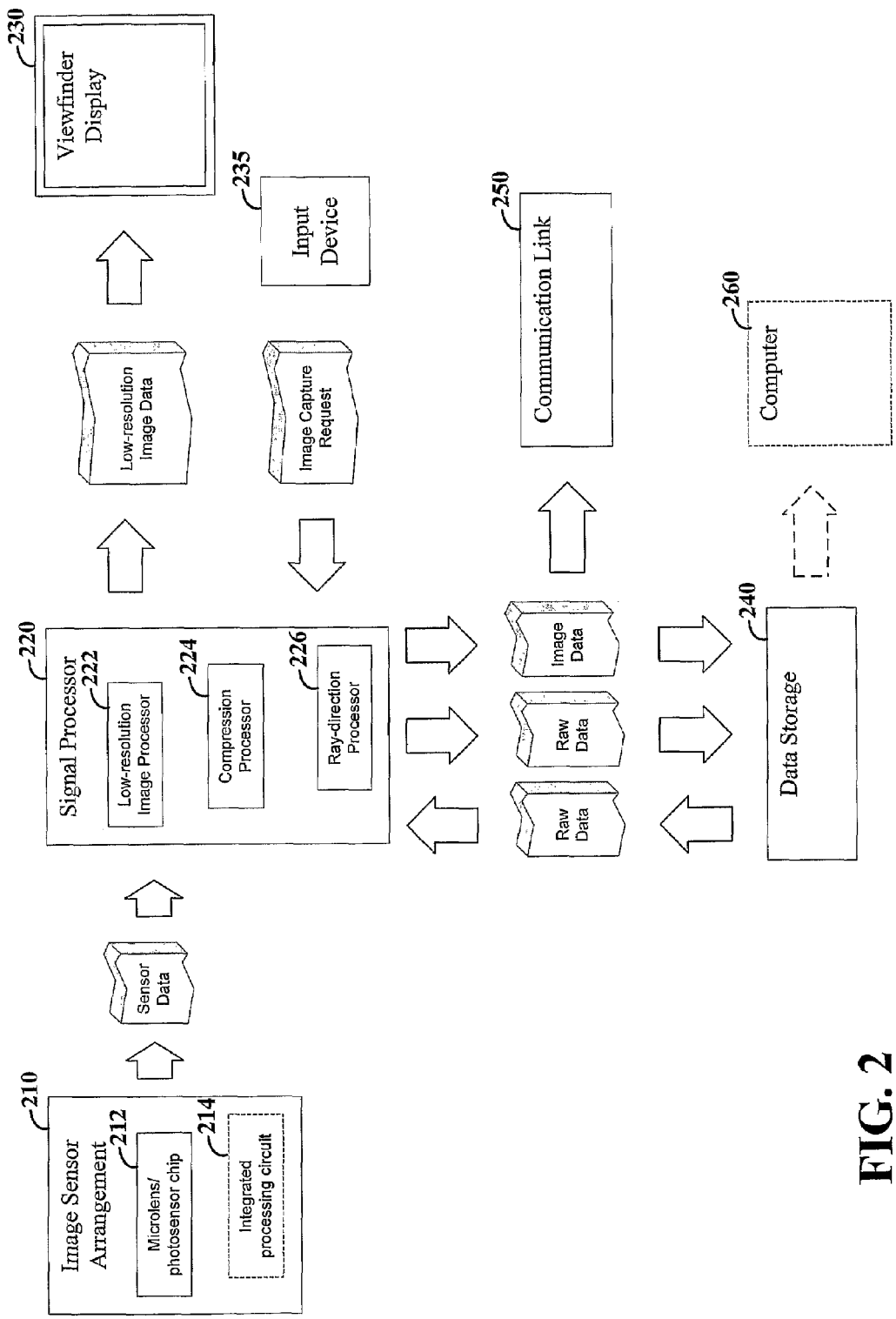
FIG. 2 is an optical imaging device, according to another example embodiment of the present invention.

FIG. 2 is a data-flow diagram showing an approach to processing microscopy images in connection with other example embodiments of the present invention. An image sensor arrangement 210 collects image data using microlens/photosensor chip arrangement 212 in a manner similar, for example, to the microlens array 120 and photosensor array 130 shown in FIG. 1A and described herein and/or in the above-referenced PCT application, which is incorporated herein by reference. The image sensor arrangement 210 optionally includes an integrated processing circuit 214 bearing certain processing circuitry to prepare collected image data for transfer.

Sensor data created at the image sensor arrangement 210 is passed to a signal processor 220. The signal processor includes a low-resolution image processor 222 and one or both of a compression processor 224 and a (light) ray-direction processor 226; each of these processors is selectively implemented separately or functionally with a common processor, depending upon the application. Furthermore, each of the processors shown in FIG. 2 is selectively programmed with one or more processing functions described in connection with other figures or elsewhere herein. The signal processor 220 is optionally implemented in a common device or component with the image sensor arrangement 210, such as on a common circuit and/or in a common image device.

The low-resolution image processor 222 uses sensor data received from the image sensor arrangement 210 to generate low-resolution image data, which is sent to a viewfinder display 230. An input device 235, such as a control input on a light-field microscope, a pushbutton on a camera or video camera implemented with a light-field microscope, or an automatic input from a computer arrangement, sends an image capture request to the signal processor 220 requesting, for example, the capture of a particular image displayed in the viewfinder display 230 and/or to initiate video imaging where so implemented.

In response to the image capture request or as otherwise directed, the signal processor 220 uses the sensor data captured by the image sensor arrangement 210 to generate processed sensor data. In some applications, the compression processor 224 is implemented to generate compressed raw data for transfer to a data storage arrangement 240 (e.g., memory). Such raw data is then selectively processed at the signal processor 220 and/or at an external computer 260 or other processing device, implementing ray-direction processing such as that implemented with the ray-direction processor 226, which is discussed further below.

In certain applications, the ray-direction processor 226 is implemented to process the sensor data received at the signal processor 220 to rearrange the sensor data for use in generating focused and/or corrected image data. The ray-direction processor 226 uses one or both of sensor data received from the image sensor arrangement 210 and raw data sent to the data storage arrangement 240. In these applications, the ray-direction processor 226 uses ray-mapping characteristics of the particular imaging device (e.g., camera, video camera or microscope) in which the image sensor arrangement 210 is implemented to determine a rearrangement of light rays sensed with the microlens/photosensor chip 212. Image data created with the ray-direction processor 226 is sent to the data storage arrangement 240 and/or to a communication link 250 for use in a variety of applications, such as in streaming image data or otherwise sending image data to a remote location.

In some applications, the integrated processing circuit 214 includes some or all of the processing functionality of the signal processor 220 by implementing, for example, a CMOS-type processor or other processor with appropriate functionality. For instance, the low-resolution image processor 222 is selectively included with the integrated processing circuit 214, with the low-resolution image data sent directly to the viewfinder display 230 from the image sensor arrangement 210. Similarly, the compression processor 224, or functionality similar thereto, is selectively implemented with the integrated processing circuit 214.

In some applications, computation of final images may be performed on the integrated processing circuit 214 (e.g., in some digital still cameras that output only final images). In other applications, the image sensor arrangement 210 may simply transmit the raw light ray data, or a compressed version of these data, to an external computational device, such as a desktop computer. Computation of final images from these data is then performed on the external device.

Referring again to FIG. 1A, and as may be applicable with one or more of FIGS. 1B-1K, a variety of embodiments involve the use of different numbers of microlenses and/or pixels per microlens. In one embodiment, the microlenses are made very small (e.g., so that each microlens spans a small pixel array, such as a 2×2 array) to obtain a microscope of limited refocusability but spatial resolution similar to that of a conventional microscope. In some embodiments, the microscope arrangement (e.g., 100 of FIG. 1A) facilitates real-time image processing (e.g., via processing circuitry 140) and is used to determine whether a moving (e.g., live) specimen is moving up or down (or to the side) relative to the microscope's current plane of focus. This information is used to drive a motorized stage, such as a Z-stage with vertical (up or down) movement, to change the plane of focus and keep the specimen in focus. With such an approach, the microscope is adapted to automatically focus upon a moving specimen (e.g., provides an auto-focus system).

In one application, since the microscope separates image capture from the selection of viewpoint and focus, a specimen is photographed and subsequently (virtually) examined at a later time, or photographed in one location and examined in another. Using these approaches, automated microscopes do not necessarily need to focus perfectly before photographing each sample in a multi-well plate, leading to higher throughput.

Another example embodiment is directed to a one-shot focusing approach. To photograph light-sensitive specimens, a microlens array is inserted with a microscope arrangement, a light field is captured and used to find interesting features and a desirable plane of focus. A motorized stage is driven to an appropriate position, the microlens array removed, and a second image captured. This approach facilitates imaging with a high lateral resolution and reduced light damage to the specimen.

In another example embodiment of the present invention, a real-time follow-focus approach is implemented. To capture video of moving specimens, an array with a large number of small microlenses (e.g., 800×800 microlenses) with 3×3 spots behind each microlens is used. Such an arrangement would facilitate sufficient axial resolution to determine whether the specimen is moving up or down. In some implementations, this movement information is then used to drive a motorized microscope stage (e.g., Z-stage).

Another example embodiment is directed to light field dissecting microscopes. When examining large specimens (tens or hundreds of microns across), appreciation of perspective is as important as lateral resolution. The light field microscope facilitates imaging of 3D structures, with the information presented using, for example, an autostereoscopic display.

In another example embodiment, the microscope shown in FIG. 1A and described above is made relatively large (e.g., relative to the above lens size examples) to image a greater number of spots, while keeping each spot size on a specimen is constant. With this approach, the linearly measured field of view on the specimen rises. This facilitates the use of relatively larger microlens arrays, thereby producing output images with relatively more pixels in them. For applications that do not require high magnification, this approach offsets the spatial resolution generally given up by a light field microscope in return for refocusability.

In connection with another example embodiment of the present invention, a phase contrast microscopy approach is implemented with the arrangement shown in FIG. 1A. In this regard, the recipes described herein are selectively implemented with differential interference contrast (DIC) methods using, for example, Nomarksy prisms. In some applications, a Zernike-like phase contrast system is built using a phase ring for each microlens pixel (e.g., rather than a single phase ring that spans an entire aperture). For example, where each microlens (e.g., in microlens array 120) has an array of 20×20 pixels beneath it, then a grid of 20×20 phase rings (and their complements) are placed at the objective's (110) aperture plane (and its conjugate at the condenser's aperture plane).

In another example embodiment, spatially varying, continuous-gradient filters are implemented at the objective's aperture plane (e.g., at the aperture plane of the main lens 110). In some applications, a mask that varies in one or more manners is implemented to suit particular needs. Such variation may involve variation in one of, for example, neutral density, wavelength selectivity, or polarization direction from the filter's center to its periphery. In addition, such variation may involve variation in an additional variable around its circumference (e.g. variation in neutral density in one area, and variation in wavelength selectivity around its circumference); as seen through the microlens array, each sensor pixel records a unique part of the specimen as modulated by a unique combination of the values of the two chosen variables. Such a light field may not be refocusable, but provides dynamic range, multi-spectral sensitivity, and/or polarization selectivity.

To illustrate one example embodiment, a microlens array having an f-number of f/4 is implemented in an experimental application as follows, which may be implemented, for example, with the approach discussed above with FIG. 1A (e.g., and a relay lens). Optical components include the following, with one example implementation thereof discussed following the components:

1. Nikon Optiphot microscope trans-illuminator with green filter
2. Condenser focused for Kohler illumination (aperture=1.3NA)
3. Zeiss Achroplan Water infinity-corrected objective (magnification=40x, aperture=0.8 NA)
4. Edmunds Scientific achromatic doublet (diam=18 mm, focal length=40 mm) serving as tube lens
5. Adaptive Optics's f/4 microlens array (square lenses, width=125 microns, focal length=500 microns)
6. Canon MP-E macro lens operating at 1:1 (focal length=65 mm, nominal aperture=f/2.8, effective aperture at 1:1=f/5.6)
7. Canon 20D digital camera (pixel size=6.4 microns)

The condenser is focused for Kohler illumination, and the objective is focused on a specimen, while viewing their projection (with no tube lens or ocular) on the room ceiling (as an approximation of infinity). The tube lens is placed at an arbitrary height above the objective, but centered by closing the illumination field stop to a near-pinhole and lining up its image on the ceiling with and without the tube lens. The microlens array (e.g., 120) is positioned vertically at the intermediate image plane by maximizing aliasing of its image of a stage micrometer. A loupe and the Canon macro lens are used as viewing aids in this process. The microlens array is leveled, and the camera and macro lens are aimed at the center of the imaging circle on the microlens array and rotated until the microlens rows are approximately aligned with pixels. The macro lens is focused on the microlens array by minimizing the size of images of a 100 micron precision pinhole introduced immediately above the illumination field stop. In some applications, the macro lens is approximately leveled with respect to the microlens array, leading to slight misfocus in the peripheries of the imaging circle. In other applications, laser-guided aiming is used (e.g., in connection with the description herein). The camera aperture is kept wide open (nominally f/2.8), and auto-focus, auto-white-balance, and mirror flip are disabled.

The foregoing paragraphs illustrate example optical arrangements and approaches. In connection with these and other examples, various embodiments are directed to the consideration of three parameters for the design of light field microscopes; these parameters include the size of the microlens array, the curvature of the individual lenses in the microlens array, and the size of the individual microlenses in the array. With the foregoing discussion in mind, the first two parameters are selectively chosen so as to make desirable use of the sensor resolution and the information in the light field. The third parameter may be freely chosen, and it allows trade off between lateral and axial resolution in the microscope.

The following approaches involving the aforesaid three parameters are applicable to one or more example embodiments of the present invention involving a light field microscope, such as with the arrangement 100 in FIG. 1A.

In some applications, the microlens array is placed at an intermediate image plane, with its size chosen to cover the image created by the objective at the intermediate image plane. This equals the linear field of view on the specimen multiplied by the lateral magnification of the objective. In one implementation, the microlens array measures 36×24 mm (e.g., corresponding to the size of a full-frame 35 mm camera sensor), with a variety of other array sizes implemented in connection with other embodiments.

The curvature of the microlenses is selected in accordance with the above. Generally, the resolving power of a multi-lens optical system is governed by the smallest numerical aperture (NA) among its lenses. In this regard, certain applications involve ensuring that the microlenses do not limit the resolution of the light field microscope, and ensuring that their images of the objective exactly fill the sensor plane without overlapping or leaving space between them, and selecting their curvature accordingly. For example, the numerical aperture of the microlenses can be selectively chosen to match the image-side numerical aperture of the objective, which is its (object-side) NA divided by its magnification M. Expressing this constraint as an f-number (focal length divided by diameter) gives N=M over 2 NA. In this regard, where a 40x/0.95 objective, f/20 microlenses are employed to facilitate a desirable corresponding f-number. In some applications, microlenses at 125 microns on a side are implemented, such that their focal length is 2.5 mm. Other curvatures are implemented in connection with various example embodiments. Certain related approaches are discussed in the above-referenced PCT patent document, to which priority is claimed.

In one example embodiment, a microscope includes several objectives in a rotating mechanical turret. A second turret includes microlens arrays that can be similarly rotated.

Relative to microlens size, in microscopy, the total resolution is related to the number of resolvable sample spots in the specimen. An example analysis of this limit is given in the above-referenced PCT patent document. In consideration of this and in connection with another example embodiment, a microscope has microlenses of 125 microns on a side, facilitating images of 288×192 pixels with a pixel size in object space of 3.1 microns, facilitating 11.8 resolvable spots per microlens. The lateral resolution on the specimen is 3.1 microns, and 11.8 spots is effectively the number of slices with non-overlapping depths of field that are produce in focal stacks. Other microlens sizes are implemented with similar approaches, as discussed, in the above-referenced PCT patent document.

Other example embodiments of the invention are directed to the production of 3D volume datasets with pinhole imaging. In pinhole imaging of a semi-transparent object, values of the object function (either its linear attenuation or emission) are integrated along rays passing through the pinhole. If the pinhole is replaced with an ideal lens, then integrals along rays are replaced with integrals over double cones centered at points in the object that are in focus. This double cone is the point-spread-function (PSF) of the lens, and it represents blurring due to defocus. If one includes the effects of diffraction, this PSF becomes hourglass shaped, having a finite waist at the plane of focus. Moving the lens along its optical axis, a sequence of images focused at different depths is formed (i.e., a focal stack). This process is a convolution of the object by the PSF to form a 3D image. Reconstruction by 3D deconvolution attempts to reassign that portion of the light recorded in each pixel that is due to blurring back to the voxels from which they came, i.e., it tries to estimate the object given the 3D image and PSF. For this task, iterative algorithms are selectively employed. To ensure convergence to a meaningful result, constraints are applied, for example that the object must be positive everywhere.

In one application, a variant iterative algorithm is used in connection with 3D imaging as discussed above, in which the first guess for the object is formed from a Wiener filtering of the 3D image, and the PSF is provided empirically. For general information regarding light microscopy and for specific information regarding approaches to processing a 3D image in connection with this example embodiment (and others), reference may be made to Holmes, T. J., Bhattacharyya, S., Cooper, J. A., Hanzel, D. V., Krishnamurthi, LIN, W., Roysam, B., Szarowski, D. H., Turner, J. N., 1995, "Light microscopic images reconstructed by maximum likelihood deconvolution" in Handbook of Biological Confocal Microscopy, ed. J. B. Pawley, Plenum Press, 389-402, which is fully incorporated herein by reference.

In order to apply these techniques to the light field data produced by the imaging arrangement shown in FIGS. 1B-1I, a PSF that is related to the size of the microlens array and to the curvature and size of each microlens is determined, in accordance with the following procedure. In some applications, the PSF of the particular microscopy arrangement implemented (i.e., as related to the size of the microlens array and to the curvature and size of each microlens) is determined in accordance with the following discussion. A light field of a subresolution fluorescent bead (e.g., 0.2 micron diameter) is recorded using standard protocol. Since the microlenses are larger than the diffraction limit, the bead fills only one microlens subimage. This light field is synthetically focused to produce a PSF that is generally free of noise and aberrations, since the focusing system is synthetic, and correctly reflects the angular range of rays captured by the objective, including any falloff in intensity. Using this PSF, the iterative algorithm described in the previous paragraph is applied, yielding a volume dataset representing the specimen.

In another example embodiment of the present invention, microlens arrays are implemented for illumination. A microlens array is placed in the illumination path of a microscope as well as in the imaging path. A video projector or other spatial light modulator is implemented therewith to facilitate the generation of arbitrary incident light fields, which could be used to implement confocal microscopy or to provide structured illumination for the improvement of resolution. For general information regarding imaging and for specific information regarding approaches to which this or other example embodiments herein may be applicable, reference may be made to Levoy, M., Chen, B., Vaish, V., Horowitz, M., McDowall, I., Bolas, M. 2004, "Synthetic aperture confocal imaging," *Proc. SIGGRAPH* 2004, which is fully incorporated herein by reference.

The following experimental approach is implemented for imaging a specimen in connection with one or more example embodiments of the present invention and may be implemented, for example, in connection with FIG. 1A. The diameter of the circular field of view is set to about 1 mm on a specimen (e.g., subject 105). A strong tube lens (focal length=40 mm) is used to reduce the magnification of the objective from 40× to 10×, so this 1 mm field of view corresponds to an imaging circle 10 mm in diameter on the intermediate image plane. The microlens array 120 is placed on this plane; in this configuration, the number of illuminated microlenses is 10 mm/125 microns=80 microlenses across the middle of the imaging circle.

Collected images (e.g., photographs) are processed using software demosaicing, rotation, cropping, contrast enhancement, and slight sharpening. Images are obtained for light fields that contain 70×70 microlens images and, in some applications, 50×50 microlens images, with 20×20 pixels within each microlens image. The rear aperture of the objective is 6.4 mm (e.g., instead of 10 mm for a 40 mm tube lens and f/4 array), so the innermost 16×16 pixels of each microlens image are illuminated. Stated another way, the array is f/4, but the rear aperture of the objective is f/6.25.

In one application, a panning sequence is implemented with observer motion approximately 6.4 mm side-to-side (the diameter of the rear aperture of the objective) relative to the 10 mm intermediate image plane imaging circle, or equivalently 640 microns side-to-side relative to the 1 mm field of view on the specimen.

In another application, focal stacks are generated digitally from post-processed photographs discussed above using an interactive program. The range of Z-positions of the synthetic focal plane is given below each stack. The first set of numbers is Z-offsets relative to the Z-position of the 10 mm intermediate image plane. Axial magnification goes as the square of lateral magnification (i.e., 10× lateral magnification=100× axial magnification), allowing a second set of numbers to be computed, giving Z-offsets relative to the in-focus plane of the 1 mm field of view on the specimen.

Using the above approaches, the panning sequences exhibit parallax, and the focal stacks exhibit multiple distinct depth planes. For instance, by translating a slide laterally, each image in the panning sequences is also orthographic projections, but at different angles, a.k.a., glide projections. Scrolling through the frames in these sequences therefore exhibits parallax, showing the three-dimensional structure of the specimen.

In some applications, magnification is increased using a 40× objective with corresponding changes in other optics, or using a 10× ocular or 4× camera projection lens, selectively implemented as a function of desirable angular resolution. In various applications, a 125-micron f/4 microlens is used in imaging about 46 samples.

In some applications, vignetting is mitigated using a mounting system that integrates a microlens array (e.g., an f/20 array) directly into a microscope camera, and or by panning a camera/imaging arrangement (e.g., under motor control) across the microlens array. For instance, in connection with the above image processing approach involving demosaicing, pixels missing from peripheral microlens images due to vignetting in the macro lens are mitigated with such an approach.

In some applications, a Zernike-type phase contrast system is implemented with one or more example embodiments, using a phase ring for each microlens (e.g., pixel). In other words, if each microlens has 20×20 pixels beneath it, then a grid of 20×20 phase rings (and their complements) are placed at the objective's aperture plane (and its conjugate at the condenser's aperture plane).

In certain applications, spatially varying filters are placed at the objective's aperture plane. For example, where such a mask is varied in neutral density, spectral transmission, or polarization direction from its center to its periphery, and varied in one of the other two variables around its circumference, then each pixel under the microlens array records its part of the specimen as modulated by a different combination of the values of the two chosen variables. Such a light field may not be refocusable, but it provides dynamic range, spectral selectivity, and/or polarization selectivity.

The following approach is implemented in connection with another example embodiment of the present invention and may, for example, be implemented with a microscope arrangement similar to the arrangement shown in FIG. 1A. A specimen is imaged with a panning sequence using a focal stack from an f/20 array, with a comparison focal stack obtained without a microlens array, using a 40×0.8NA Zeiss Achroplan Water infinity-corrected objective, with an official Zeiss tube lens. The tube lens is selectively corrected for lateral color. The physical setup involves a camera arranged with a microscope to image a specimen in the microscope.

Using this approach, extra spatial resolution is provided by an f/20 array, relative to an f/4-array, and the angular resolution is still high enough that the panning sequences exhibit good parallax and the focal stacks exhibit multiple distinct depth planes. In addition, the raw camera image is completely filled with microlens images via the location and arrangement of the microlens array; the intermediate image plane (where the microlens array is placed) is 4 times as far away (160 mm instead of 40 mm) and is therefore physically 4 times as large. Also, the Zeiss tube lens is large enough to mitigate clipping of the field. Thus, the imaging circle visible by eye (on a ground glass screen) is 68 mm in diameter instead of 17 mm. In the present experiment, a Canon 100 mm f/2.8 macro lens is used at 1:1 as the relay lens and the sensor is filled with microlenses. Thus, the imaged field of view is 21 mm on the imaging circle, instead of 8.75 mm for an f/4 array. This corresponds to 168×113 microlenses, instead of 70×70, hence a final image resolution of 168×113 pixels.

With the 0.8 NA objective, a 6.4 mm image-side aperture and a 160 mm intermediate focal plane are established. Thus, the system is at f/25; not the f/20 the array is designed for. This causes about the same fraction of the microlenses to be filled as with the f/4 array—about 16×16 pixels out of 20×20 possible (assuming a 1:1 relay lens system). With this and other approaches, and referring to FIG. 1A by way of example, various embodiments are directed to microscopy imaging via use of less than all of the available photosensors (and pixels), to suit a variety of imaging needs.

In some applications, a 40×0.95 NA Plan-Apo objective is used, and in some instances, further with a green filter in place to circumvent lack of the ocular's lateral color correction. Such a configuration fills the microlenses completely, or nearly completely. In some applications, a tendency of the intensity of the microlens images to fall off slowly toward their boundaries is mitigated.

In another example embodiment, a side to side panning approach is implemented to produce a sequence of orthographic projections at different angles; these orthographic projections may be referred to as glide projections, and are used to provide orthographic projections of a particular specimen. In some applications, such a panning approach is implemented to facilitate a tomographic reconstruction.

In another example embodiment, the entire light field is recorded for an image of a specimen, and used to produce perspective views. The produced views are off-axis views (e.g., akin to laterally shifting the lens in a bellows camera.

Another example embodiment is directed to the implementation of a telecentric microscope (e.g., with the arrangement shown in FIG. 1A, and as described with FIGS. 1B-1I). A digital refocusing algorithm is implemented to correct images obtained with digital refocusing code that expects a two-plane light field with the usual u,v,s,t parameterization. The digital refocusing algorithm takes in consideration that the input data is telecentric and appropriately corrects the data. Such an algorithm may be implemented, for example, in connection with those approaches discussed herein, as well as in the various cited references.

In some embodiments, lens aberration is corrected (e.g., in a manner as described in more detail below) for light field microscopy, with the microscope objective as the main lens, to extend the useful field of view beyond an 18-20 mm (measured on the intermediate image plane). For example, a detected light field is resampled to correct for lens aberrations in a microscope objective for certain applications, facilitating the use of microscopes with large field numbers. In other applications, objectives are designed with such an approach, in which certain aberrations are favored (e.g., optimized) while others are ignored.

Referring again to FIG. 1A, a variety of items not described above are described here, and certain items described above are also described here, in further detail. In each embodiment, the arrangement/imaging system 100 includes an imaging arrangement 190 having a main lens 110 (e.g., objective), a microlens array 120 and a photosensor array 130. In this case, the microlens array 120 and photosensor array 130 implement a light ray sensor. Although FIG. 1A illustrates a particular main lens 110 (single element) and particular microlens array 120, those skilled in the art will recognize that a variety of lenses and/or microlens arrays (currently available or developed in the future) are selectively implemented with a similar approach by, for example, replacing the shown main lens and/or microlens array.

Rays of light from a single point on a subject 105 in an imaged scene (e.g., a microscope specimen) are brought to a single convergence point on the focal plane of the microlens array 120. A microlens 122 at this convergence point separates these rays of light based on the direction of the light, creating a focused image of the aperture of the main lens 110 on the photosensors underneath the microlens.

The photosensor array 130 detects light incident upon it and generates an output that is processed using one or more of a variety of components. In this application, the output light data is passed to sensor data processing circuitry 140, which uses the data together with positional information about each photosensor providing the data in generating an image of the specimen (e.g., including points 105, 106 and 107 of a common specimen and/or of different specimen). The sensor data processing circuitry 140 is implemented, for example, with a computer or other processing circuit selectively implemented in a common component (e.g., a chip) or in different components. In one implementation, a portion of the sensor data processing circuitry 140 is implemented in the imaging arrangement 190, with another portion of implemented in an external computer.

Using the detected light (and, e.g., characteristics of the detected light) together with a known direction from which the light arrived at the microlens array (as computed using a known location of each photosensor), the sensor data processing circuitry 140 selectively refocuses and/or corrects light data in forming an image (where refocusing may be correcting). Various approaches to processing detected light data are described in detail herein, with and without reference to other figures. These approaches may be selectively implemented with the sensor data processing circuitry 140 consistent with the above.

Different portions of the light field microscopy imaging system 100 are selectively implemented in a common or separate physical arrangement, depending upon the particular application. When implemented with a variety of applications, the microlens array 120 and the photosensor array 130 are combined into a common arrangement 180. For instance, the microlens array 120 and the photosensor array 130 are coupled together on a common chip or other circuit arrangement. When implemented with a microscope, the main lens 110, microlens array 120 and photosensor array 130 are selectively combined into a common imaging arrangement 190 integrated with the microscope (e.g., with a microscope barrel). Where appropriate, a microscope stage supports the specimen 105 and forms part of a microscope arrangement including the objective 110 and, in some applications, the microlens array 120 and photosensor array 130. Furthermore, certain applications involve the implementation of some or all of the sensor data processing circuitry 140 in a common circuit arrangement with the photosensor array 130 (e.g., on a common chip).

Other applications are directed to the implementation of the main lens and the subject/specimen 105 (e.g., on a microscope stage) in a microscope, with the microlens array 120 and the photosensor array 130 implemented separately, with light from the main (objective) lens 110 passed to the microlens array 120 (e.g., using a relay lens). In this context, the arrangement 180 may be implemented with a camera arrangement that is separate from a microscope bearing the subject and the main lens 110. Various discussion herein, as well as that in the above-referenced PCT application (to which priority is claimed), are directed to a "camera" and thus contemplate such a separate approach as well as an approach in which the camera functions (e.g., via the microlens array 120, photosensor array 130 and, where appropriate, processing circuitry 140) are implemented with the microscope.

In some applications, the imaging arrangement 100 includes a preview arrangement 150 for presenting a preview image to a user capturing images of a specimen. The preview arrangement is communicatively coupled to receive image data from the photosensor array 130. A preview processor 160 processes the image data to generate a preview image that is displayed on a preview screen 170. In some applications, the preview processor 160 is implemented together with the image sensor 180, on a common chip and/or in a common circuit. In applications where the sensor data processing circuitry 140 is implemented with the photosensor array 130 as discussed above, the preview processor 160 is selectively implemented with the sensor data processing circuitry 140, with some or all of the image data collected by the photosensor array 130 used to generate the preview image.

The preview image may be generated using relatively fewer computational functions and/or less data than that used to generate a final image. For instance, when implemented to determine a field of view that is desirable for imaging a particular specimen, a preview image that does not effect any focusing or lens correction may be sufficient; once a field of view is set, a more detailed image of a specimen can be obtained. In this regard, it may be desirable to implement processing circuitry that is relatively inexpensive and/or small to generate the preview image. In such applications, the preview processor generates the image at a relatively low-computational cost and/or using less data, for example by using the first extended depth of field computational method as described above.

In one embodiment, a low-resolution preview image is generated by computing an image with extended depth of field, rather than an image that is focused at one particular plane. Such an image is computed using a so-called extended depth of field computational method. The procedure is to first compute a focal stack (i.e., a sequence of images each focused at a different depth as described herein), then to run an algorithm that, for each pixel in the field of view, searches among the images in the stack for that image in which the pixel is the sharpest. The resulting synthetic image is sharp everywhere.

The imaging system 100 is implemented in a variety of manners, depending upon the application. For instance, while the microlens array 120 is shown with several distinguishable microlenses by way of example, the array is generally implemented with a multitude (e.g., thousands or millions) of microlenses for many embodiments. The photosensor array 130 generally includes a relatively finer pitch than the microlens array 120, with several photosensors for each microlens in the microlens array 120 (e.g., as with certain examples described above). In addition, the micolenses in the microlens array 120 and the photosensors in the photosensor array 130 are generally positioned such that light passing via each microlens to the photosensor array does not overlap light passed via adjacent microlenses.

Figure 3:
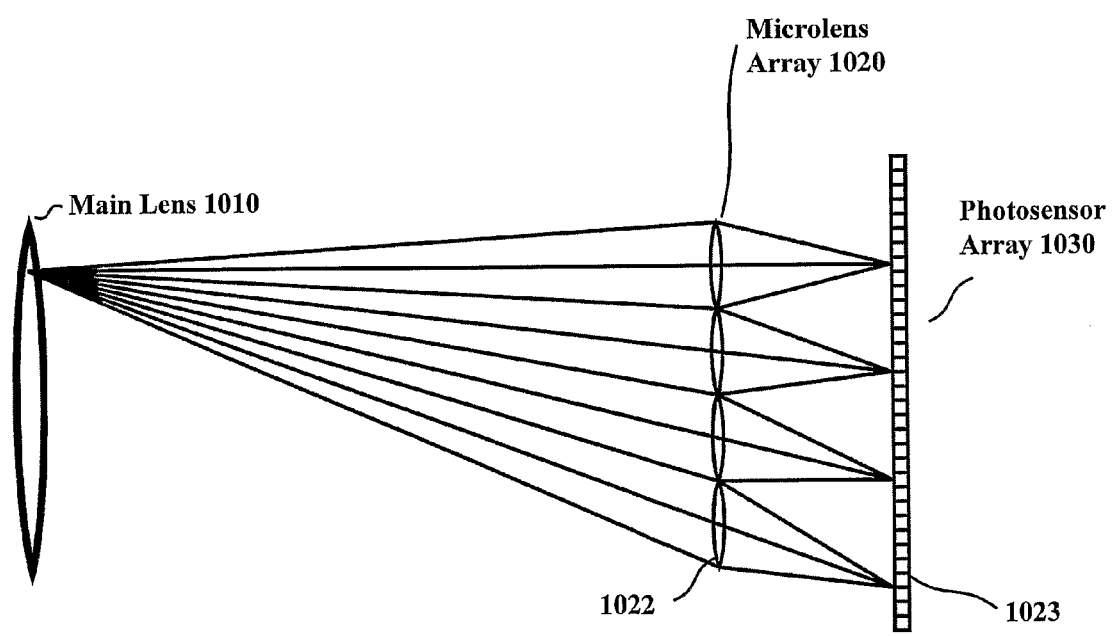
FIG. 3 illustrates one example approach to separating light rays, according to another example embodiment of the present invention.

In various applications, the main lens 110 is translated along its optical axis (as shown in FIG. 1A, in a horizontal direction) to focus on a specimen of interest at a desired depth "d" as exemplified between the main lens and an example imaging specimen 105. In other applications, the specimen itself is moved (e.g., by moving a stage upon which the specimen is located); certain applications are directed to controlling the movement of such a stage in response to data from the processing circuitry 140. Certain focusing applications as described above, for example, involve focusing to a live specimen and, in some applications, auto-focusing to maintain a proper image of the specimen as the specimen moves. By way of example, light rays from a single point on the subject 105 are shown for purposes of this discussion. These light rays are brought to a single convergence point at microlens 122 on the focal plane of the microlens array 120. The microlens 122 separates these rays of light based on direction, creating a focused image of the aperture of the main lens 110 on a set of pixels in the array of pixels underneath the microlens. FIG. 3 illustrates one example approach to separating light rays, such that all rays emanating from a point on a main lens 1010 and arriving anywhere on the surface of the same microlens (e.g., 1022) are directed by that microlens to converge at the same point on a photosensor (e.g., 1023). This approach shown in FIG. 3 may, for example, be implemented in connection with FIG. 1A (i.e., with the main lens 1010 implemented for main lens 110, with microlens array 1020 implemented for microlens array 120, and with photosensor array 1030 implemented for photosensor array 130).

The image that forms under a particular microlens in the microlens array 122 indicates the directional resolution of the system for that location on the imaging plane. In some applications, directional resolution is enhanced by facilitating sharp microlens images, with the microlenses focused on the principal plane of the main lens 110. In certain applications the microlenses are at least two orders of magnitude smaller than the separation between the microlens array 120 and the main lens 110. In these applications, the main lens 110 is effectively at the microlenses' optical infinity; to focus the microlenses, the photosensor array 130 is located in a plane at the microlenses' focal depth.

The separation "s" between the main lens 110 and the microlens array 120 is selected to achieve a sharp image within the depth of field of the microlenses and, where appropriate, such that the f-number of the image and object side of the main lens 110 match as described above. In many applications, this separation is accurate to within about $\Delta x_p \cdot (f_m / \Delta x_m)$, where $\Delta x_p$ is the width of a sensor pixel, $f_m$ is the focal depth of the microlenses and $\Delta x_m$ is the width of the microlenses. In one particular application, $\Delta x_p$ is about 9 microns, $f_m$ is about 500 microns and $\Delta x_m$ is about 125 microns, with the separation between the microlens array 120 and the photosensor array 130 being accurate to about 36 microns.

The microlens array 120 is implemented using one or more of a variety of microlenses and arrangements thereof. In one example embodiment, a plane of microlenses with potentially spatially varying properties is implemented as the microlens array 120. For example, the microlens array may include lenses that are homogeneous and/or inhomogeneous, square in extent or non-square in extent, regularly distributed or non-regularly distributed, and in a pattern than is repeating or non-repeating, with portions that are optionally masked. The microlenses themselves may be convex, non-convex, or have an arbitrary profile to effect a desired physical direction of light, and may vary in profile from microlens to microlens on the plane. Various distributions and lens profiles are selectively combined. These various embodiments provide sampling patterns that are higher spatially (correspondingly lower angularly) in some regions of the array, and higher angularly (correspondingly lower spatially) in other regions. One use of such data facilitates interpolation to match desired spatial and angular resolution in the 4D space.

In other example embodiments, a regular mosaic of larger and smaller microlenses is used. In one implementation; the resulting photosensor data is interpolated to provide a homogeneous sampling that has the maximum spatial and angular resolutions of a microlens or microlenses in the mosaic.

Referring again to FIG. 1A, the aperture sizes of the main lens 110 and of the microlenses in the microlens array 120 (e.g., the effective sizes of the opening in the lenses) are also selected to meet specific applications in which the microscopy imaging arrangement 100 is implemented. In many applications, the relative aperture sizes are selected so that collected images are as large as possible without overlapping (i.e., such that light does not undesirably overlap onto an adjacent photosensor). This approach is facilitated by matching the f-numbers (focal ratios; i.e., the ratio of the aperture to the effective focal length of the lens) of the main lens and the microlenses, as described above. In this instance, the effective focal length, in terms of the f-number, for the main lens 110 is the ratio of the diameter of the aperture of the main lens to the distance "s" between the main lens 110 and the microlens array 120. In applications in which the principal plane of the main lens 110 is translated relative to the plane at which the microlens array 120 is located, the aperture of the main lens is selectively modified so as to maintain the ratio and thus the size of the images forming under each microlens in the microlens array. In some applications, different main lens aperture shapes such as a square aperture are used to achieve desirable (e.g., efficient) packing of the array of images under the microlens array on the photosensor surface.

In one example embodiment, the resolution of the microlens array 120 is selected to match a particular application's desired resolution for final images. The resolution of the photosensor array 130 is selected so that each microlens covers as many photosensors as required to match the desired directional resolution of the application, or the finest resolution of photosensors that may be implemented. In this regard, the resolution of the imaging system 100 (and other systems discussed herein) is selectively tailored to particular applications, with considerations such as the type of imaging, cost, complexity and available equipment used to arrive at a particular resolution.

Once image data is captured via optics and sensors (e.g., using imaging arrangement 190 in FIG. 1A), a variety of computational functions and arrangements are implemented to selectively process the image data to facilitate light-field microscopy. In one example embodiment of the present invention, different sets of photosensors capture these separated light rays from each microlens and pass information about the captured light rays to a computational component such as a processor. Specimen images are computed from the set of measured light rays.

In the context of FIG. 1A, sensor data processing circuitry 140 is implemented to process the image data and compute images of a specimen including points 105, 106 and 107 (e.g., of a single specimen or three separate specimens). In some applications, a preview arrangement 150 is also implemented to generate a preview image using a preview processor 160, with the preview image displayed on a preview screen 170. The previous processor 160 is selectively implemented with the sensor data processing circuitry 140, with a preview image generated in a manner not inconsistent, for example, with approaches discussed herein.

In another embodiment, for each pixel in an image output from a sensor arrangement, the computational component weights and sums a subset of the measured rays of light. In addition, the computational component may analyze and combine a set of images computed in the manner described above, for example, using an image compositing approach. Although the present invention is not necessarily limited to such applications, various aspects of the invention may be appreciated through the discussion of several specific example embodiments of such a computational component.

In connection with various example embodiments, image data processing involves refocusing at least a portion of an image being captured for light-field microscopy. In some embodiments, an output image is generated in the context of a photograph of a specimen, obtained via a microscope, focused on desired elements of the specimen. In some embodiments, the computed image is focused at a particular desired depth in the specimen, with misfocus blur increasing away from the desired depth as in a conventional photograph. Different focal depths are selected to focus upon different portions of the specimen.

A variety of approaches involve selective implementation of different apertures. In one example embodiment, the virtual aperture on the virtual lens plane is a generally circular hole, and in other example embodiments, the virtual aperture is generally non-circular and/or is implemented with multiple distinct regions of any shape. In these and other embodiments, the notion of "virtual aperture" can be generalized, and in some applications, corresponds to an approach involving the processing of light data to correspond to light that would be received via a selected "virtual" aperture.

In another example embodiment, a virtual aperture function varies from pixel to pixel. In one specific embodiment, the function is chosen to mask out rays from undesired portions of a particular scene, such as an undesired object in the foreground.

In another example embodiment, an image with extended depth of field is computed by focusing on more than one subject at the same time. In one implementation, the depth of field of the output image is extended by simulating conventional photographic microscopy imaging with a stopped-down (reduced size) main lens aperture. For each output pixel, an evaluation is performed using the rays of light that would have converged at the output pixel through an aperture (on the virtual lens plane) that is smaller than the aperture used in ray sensing.

In one implementation involving the example system 100 shown in FIG. 1A, the depth of field is extended by extracting a photosensor value under each microlens image, where each photosensor is located at the same relative position within each microlens image. With respect to FIG. 1A, extending the depth of field produces an image in which not only the specimen 105 is in focus (due to the correlation between the distances "d" and "s") but also other objects at a different depths, or other portions of the specimen at different depths, such as those represented by 106 and 107 that may otherwise be blurry due to misfocus. This approach to extending the depth of field, coupled with optional downsampling of the resulting image, is computationally efficient. This approach is selectively implemented in applications where noise generated with the image is tolerable, such as where the image generated is for preview purposes (e.g., for display at the preview screen 170 in FIG. 1A).

In one alternative embodiment, a minimum set of refocused images to compute is defined as follows, in terms of the distance between a virtual film plane for each refocused image and the principal plane of the main lens via which the light for the image is passed to the virtual film plane. A minimum distance is set at the focal length of the main lens, and the maximum distance set at the conjugate depth for the closest object in the specimen. The separation between each virtual film plane is no more than $\Delta x_m f/\Delta A$, where $\Delta x_m$ is the width of a microlens, f is the separation between the main lens and the microlens array, and A is the width of the lens aperture.

In another example embodiment, refocused images are combined to produce an extended depth of field image at each final pixel to retain the pixel that is best focused in any of the set of refocused images. In another embodiment pixels to retain are chosen by enhancing the local contrast and coherence with neighboring pixels. For general information regarding imaging, and for specific information regarding approaches to imaging involving enhancing local contrast, reference may be made to Agarwala, A., Dontcheva, M., Agrawala, M., Drucker, S., Colburn, A., Curless, B., Salesin, D., Cohen, M., Interactive Digital Photomontage, in ACM Transactions on Graphics, 23, 3 (2004), 292-300, which is fully incorporated herein by reference.

In another example embodiment of the present invention, an extended depth of field image is computed as follows. For each output image pixel, a refocusing computation is performed at the pixel to focus at different depths. At each depth, a measure of the homogeneity of the rays that converge is computed. The depth that produces the (relative) maximum homogeneity is chosen and kept for that pixel value. With this approach, where an image pixel is in focus, all of its rays originate from the same point of the specimen and thus are likely to have similar color and intensity.

Although the measure of homogeneity can be defined in various ways, for many applications, the following measure of homogeneity is used: for each color component of each ray, the squared difference of that color intensity is computed from the corresponding color component of the central ray (the ray that arrives at the pixel at an angle closest to the optical axis of the main lens). All of these squared differences are summed, and the homogeneity is taken to be the reciprocal of the sum.

Figure 4:
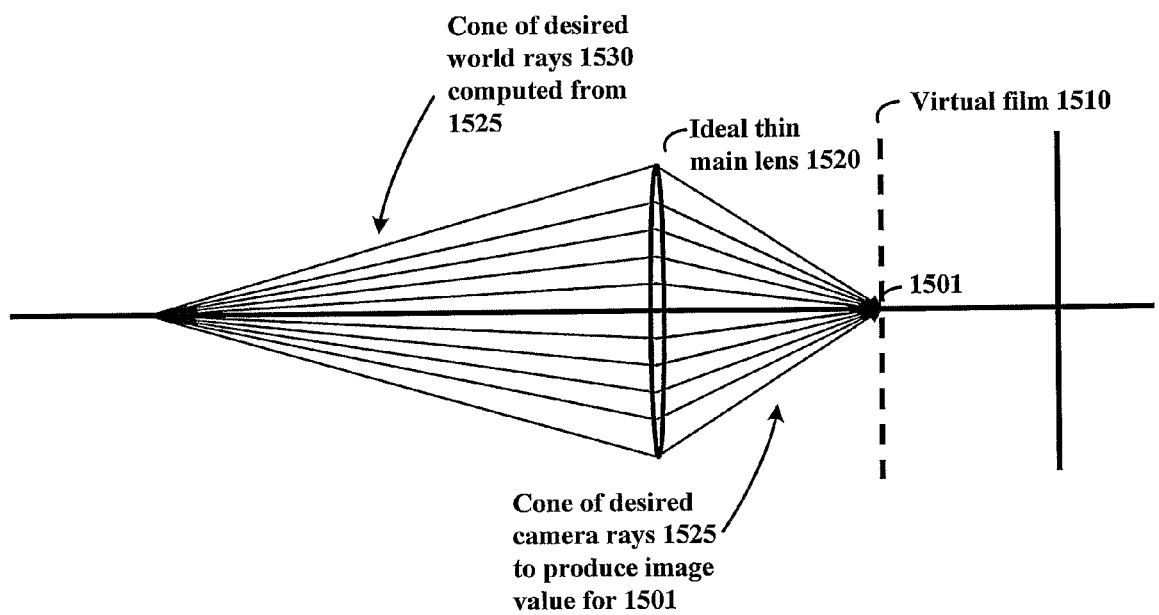
FIG. 4 illustrates an approach to the tracing of rays from a 3D point on a virtual film plane, according to another example embodiment of the present invention.

In one image correction-type embodiment, the world of rays (i.e., all rays from a specimen on a stage) that contribute to each pixel as formed through idealized optics is computed for each pixel on a film of a synthesized microscopy image. In one implementation, these rays are computed by tracing rays from the virtual film location back through the ideal optics into the world. FIG. 4 illustrates an approach to the tracing of rays from a 3D point 1501 on a virtual film plane 1510 through an ideal thin main lens 1520 out into a cone of world rays 1530, in connection with one such example embodiment. In some implementations, the set of desired rays 1525 may not necessarily correspond to direction through a real lens, but may correspond to any set of rays that are to be weighted and summed to produce a desired image value.

Figure 5:
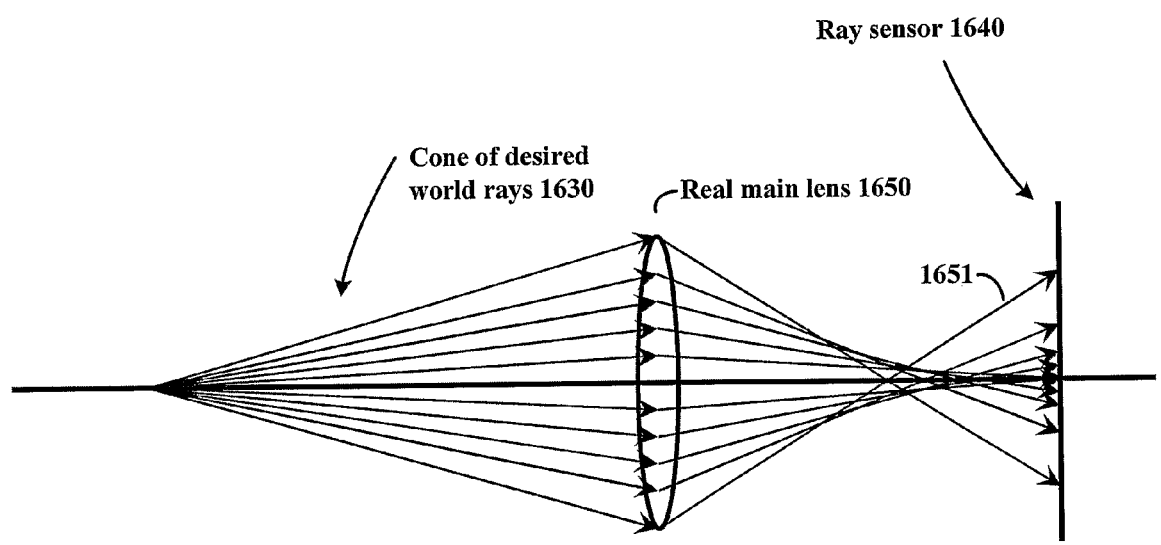
FIG. 5 shows an approach to finding the value of light, according to another example embodiment of the present invention.

FIG. 5 shows an approach to finding the value of light traveling along ideal rays for a particular application, in connection with another example embodiment. These values are computed by tracing desired ideal world rays 1630 through a real main lens 1650, having a single element with spherical interfaces, used to physically direct the real world light rays to the ray sensor 1640 at the time the rays are measured (detected). In this embodiment, the rays that would ideally converge to a single 3D point, do not converge, representing a defect of lenses with spherical interfaces called spherical aberration. The ray sensor 1640 provides individual values for each of the aberrated rays (such as 1651), which are used to correct for the spherical aberration.

In another example embodiment of the present invention, chromatic aberrations are corrected in a main lens used to capture an image. Chromatic aberration is caused by the divergence of rays of light as they are physically directed through optics because of differences in the physical direction dependent on the wavelength of light. The incoming rays are traced through the actual optics, taking into account the wavelength-dependent refraction of light that occurs in the actual optics. In some applications, each color component of the system is traced separately based on the primary wavelength.

While various example correction processes are described in terms of ray-tracing for conceptual simplicity in connection with various embodiments; a variety of other approaches are implemented with correction. In one embodiment, for each desired output pixel, the set of photosensor values that contribute are pre-computed along with their relative weights. As described above, these weights are a property of a number of factors that may include the optics, sensor, desired set of rays to be weighted and summed for each output pixel and desired light field reconstruction filter. These weights are pre-computed, selectively using ray-tracing, and stored. A corrected image is formed by weighting and adding the appropriate sensed light field values for each output pixel used to generate a microscopy image.

In a variety of example embodiments, light data is processed in the frequency domain, with certain approaches directed to computational approaches to refocusing that operate in the Fourier domain. Such approaches are implemented as described, for example, in the above-referenced PCT application which is incorporated herein by reference.

In another example embodiment of the present invention, a computational component such as a processor is programmed to selectively choose rays to combine in computing output pixels in order to effect a desired net filtering for that pixel value. By way of example, consider embodiments involving an optical neutral gradient density filter at the main lens, each image of the lens aperture that appears under a microlens is weighted by the filter gradient across its extent. In one implementation, output images are computed by selecting a photosensor under each microlens at the point of the gradient that matches the desired level of neutral-density filtering for that output image pixel. For example, to produce an image in which every pixel is filtered to a large extent, every pixel value is set to the value of the photosensor under the corresponding microlens that is at the extreme end of the gradient corresponding to maximum filtering.

The sensor data processing circuitry implemented with one or more example embodiments described herein includes one or more microprocessors, Application-Specific Integrated Circuits (ASICs), digital signal processors (DSPs), and/or programmable gate arrays (for example, field-programmable gate arrays (FPGAs)), depending upon the implementation. In this regard, sensor data processing circuitry may be any type or form of circuitry whether now known or later developed. For example, the sensor data processing circuitry may include a single component or a multiplicity of components (microprocessors, ASICs and DSPs), either active and/or passive, which are coupled together to implement, provide and/or perform a desired operation/function/application.

In various applications, the sensor data processing circuitry performs or executes one or more applications, routines, programs and/or data structures that implement particular methods, tasks or operations described and/or illustrated herein. The functionality of the applications, routines or programs are selectively combined or distributed in certain applications. In some applications, the applications, routines or programs are implemented by sensor (or other) data processing circuitry using one or more of a variety of programming languages, whether now known or later developed. Such programming languages include, for example, FORTRAN, C, C++, Java and BASIC, whether compiled or uncompiled code, selectively implemented in connection with one or more aspects of the present invention.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include implementing the various optical imaging applications and devices in different types of microscopy (or other) applications, using different imaging devices in connection with light-field microscopes, increasing or decreasing the number of rays collected per pixel (or other selected image area), or implementing different algorithms and/or equations than the examples described to assemble or otherwise process image data. Other changes may involve using coordinate representations other than or in addition to Cartesian coordinates, such as polar coordinates. Such modifications and changes do not depart from the true spirit and scope of the present invention.

What is claimed is:

1. A light-field microscopy system for imaging a specimen in a light-field microscope arrangement, the system comprising:
    an objective lens;
    a photosensor array; and
    a microlens array located at an intermediate image plane between the photosensor array and the objective lens, wherein the photosensor array detects light rays passing from the objective lens and through the microlens array at a resolution that is sufficiently high to record a light field of the specimen for computing a three-dimensional volume image dataset of the specimen.

2. The system of claim 1, wherein the photosensor array and the microlens array are arranged to facilitate the detection of a light field from the specimen, and to provide light data for computing an image of the specimen using the light field from the specimen.

3. The system of claim 1, wherein the microlens array and photosensor array are respectively arranged to detect light and to provide, for each microlens, at least two sample image portions of the specimen, and to provide directional information regarding light from the specimen.

4. The system of claim 1, wherein the $f$-number of the image-side of the objective lens matches the $f$-number of the microlenses.

5. A light-field microscopy system for collecting data useful for digitally imaging a specimen in a light-field microscope arrangement, the system comprising:
    an objective lens;
    a photosensor array;
    a microlens array located at an intermediate image plane between the photosensor array and the objective lens, where the photosensor array detects light rays passing from the objective lens and through the microlens array; and
    a processor configured to receive data from the photosensor array and to compute an image of the specimen, the data characterizing light detected at the photosensor array at a resolution sufficiently high for the processor to compute the image as a three-dimensional volume dataset using one of: 3D convolution, tomography, and a stack of images where each image in the stack is focused to a different depth into the specimen.

6. The system of claim 5, wherein the processor computes a three-dimensional volume dataset of the specimen using 3D deconvolution.

7. The system of claim 5, wherein the processor computes a three-dimensional volume dataset of the specimen using tomography.

8. The system of claim 5, wherein the processor computes a stack of images, each image in the stack focused to a different depth into the specimen, relative to the objective, and computes a three-dimensional volume dataset of the specimen via the combination of the stack of images.

9. The system of claim 5, wherein the processor is implemented with a light-field microscope arrangement having the objective lens, photosensor array and microlens array.

10. The system of claim 5, wherein the processor is separate from an arrangement with the objective lens, photosensor array and microlens array.

11. The system of claim 5, further including at least one filter between the microlens array and the objective lens.

12. The system of claim of claim 5, wherein computing an output image includes refocusing the detected light to form an image having at least a portion thereof focused at a different plane than the focal plane of the microscope.

13. The system of claim 5, wherein the processor is adapted to use light data from the photosensor array to record a light field to determine a desirable plane of focus, and to provide information for positioning at least a portion of the light-field microscope arrangement for recording a final image of the specimen without the microlens array.

14. The system of claim 5, wherein the processor is adapted to use the light data from the photosensor array to provide information for positioning at least a portion of the light-field microscope arrangement in order to follow the motion of a moving specimen.

15. A light-field microscopy system for collecting data useful for digitally imaging a specimen in a light- field microscope arrangement, the system comprising:
    an objective lens;
    a photosensor array;
    a microlens array located at an intermediate image plane between the photosensor array and the objective lens, the photosensor array being configured to detect light rays passing through the microlens array;
    a second microlens array in the illumination path that facilitates the illumination of the specimen with an arbitrary four-dimensional light field; and
    a processor configured to
        receive, from the photosensor array, data characterizing light detected at the photosensor array, and compute an image of the specimen using the received data.

16. The system of claim 5, wherein the processor computes a perspective image of the specimen.

17. The system of claim 5, wherein the processor computes an oblique image of the specimen.

18. The system of claim 5, wherein the processor computes an image of the specimen with an extended depth of field.

19. A light-field microscopy system for collecting data useful for digitally imaging a specimen in a light-field microscope arrangement, the system comprising:
   an objective lens;
   a photosensor array;
   a microlens array located at an intermediate image plane between the photosensor array and the objective lens, where the photosensor array detects light rays from the specimen, passing from the objective lens and through the microlens array; and
   a processor configured to receive data from the photosensor array and to compute an image of the specimen using the received data, the data characterizing a light field detected at the photosensor array at a resolution sufficiently high for the processor to compute the image as a three-dimensional volume dataset of the specimen.

20. The system of claim 19, wherein the microlens array includes a number of microlenses that sets the spatial resolution of the detected light field and the number of pixels in the computed image.

21. The system of claim 19, wherein the microlens array and photosensor array are configured to set the angular resolution of the detected light field by setting the number of resolvable spots in each microlens sub-image.

22. The system of claim 19, wherein the microlens array and photosensor array are configured to set the angular resolution of the detected light field by setting the number of unique oblique views that can be computed from each microlens sub-image.

23. The system of claim 19, wherein the processor is configured to compute an image of the specimen by computing a plurality of volume images that respectively represent an image of a slice of the specimen.

24. The system of claim 19, wherein
   the processor is configured to compute an image of the specimen by computing a plurality of volume images that respectively represent slices of the specimen, and
   the microlens array and photosensor array are configured to set the number of the slices with non-overlapping depths of field in focal stacks computed from the detected light field.

\* \* \* \* \*